(12) United States Patent
Bayley et al.

(10) Patent No.: US 11,119,670 B2
(45) Date of Patent: Sep. 14, 2021

(54) METHODS AND SYSTEMS FOR EFFICIENT ENCODING AND DECODING COMMUNICATIONS

(71) Applicant: SeaPort, Inc., San Diego, CA (US)

(72) Inventors: Gwain Bayley, San Diego, CA (US); William F. Van Duyne, San Diego, CA (US); William Spazante, San Diego, CA (US)

(73) Assignee: SeaPort, Inc., San Diego, CA (US)

( * ) Notice: Subject to any disclaimer, the term of this patent is extended or adjusted under 35 U.S.C. 154(b) by 83 days.

(21) Appl. No.: 16/569,456

(22) Filed: Sep. 12, 2019

(65) Prior Publication Data

US 2020/0092079 A1    Mar. 19, 2020

Related U.S. Application Data

(60) Provisional application No. 62/845,757, filed on May 9, 2019, provisional application No. 62/811,249, filed
(Continued)

(51) Int. Cl.
| | |
|---|---|
| *G06F 3/06* | (2006.01) |
| *H04L 9/08* | (2006.01) |
| *H04L 9/06* | (2006.01) |
| *H04W 12/06* | (2021.01) |
| *H03M 13/09* | (2006.01) |
| *H04W 12/033* | (2021.01) |

(Continued)

(52) U.S. Cl.
CPC ............ *G06F 3/0632* (2013.01); *G06F 3/067* (2013.01); *G06F 3/0623* (2013.01); *H03M 13/09* (2013.01); *H04L 9/065* (2013.01);

*H04L 9/0618* (2013.01); *H04L 9/0656* (2013.01); *H04L 9/088* (2013.01); *H04L 9/0825* (2013.01); *H04L 9/0847* (2013.01); *H04L 9/0869* (2013.01); *H04W 12/033* (2021.01); *H04W 12/041* (2021.01); *H04W 12/0433* (2021.01); *H04W 12/06* (2013.01); *H04W 12/106* (2021.01); *H04L 9/0841* (2013.01)

(58) Field of Classification Search
None
See application file for complete search history.

(56) References Cited

U.S. PATENT DOCUMENTS

| | | | |
|---|---|---|---|
| 2002/0076044 A1* | 6/2002 | Pires | H04L 9/16 380/37 |
| 2002/0191784 A1* | 12/2002 | Yup | H04L 9/0631 380/37 |

(Continued)

*Primary Examiner* — Simon P Kanaan
(74) *Attorney, Agent, or Firm* — Patterson + Sheridan LLP

(57) ABSTRACT

In some aspects, an apparatus for encoding a stream of data for transmission to a receiver device comprises a memory device and a hardware processor. The memory device is a memory device configured to store at least one parameter associated with at least one cryptographic protocol, the at least one parameter identifying one or more cipher directives from a plurality of cipher directives including an exclusive-OR (XOR) function and a table lookup function. The hardware processor is configured to generate, for transmission to the receiver device, a frame comprising a first field identifying a custom or non-custom cryptographic scheme and a second field identifying a first cipher directive of the plurality of cipher directives.

22 Claims, 10 Drawing Sheets

Related U.S. Application Data on Feb. 27, 2019, provisional application No. 62/731,714, filed on Sep. 14, 2018, provisional application No. 62/731,637, filed on Sep. 14, 2018.

(51) Int. Cl.
*H04W 12/041* (2021.01)
*H04W 12/106* (2021.01)
*H04W 12/0433* (2021.01)

(56) References Cited

U.S. PATENT DOCUMENTS

| | | | |
|---|---|---|---|
| 2003/0070092 A1* | 4/2003 | Hawkes | H04W 4/06 726/4 |
| 2003/0142818 A1* | 7/2003 | Raghunathan | H04L 63/0428 380/1 |
| 2015/0301802 A1* | 10/2015 | Katoh | G11C 13/0002 708/190 |
| 2017/0250796 A1* | 8/2017 | Samid | H04L 9/0838 |
| 2018/0075262 A1* | 3/2018 | Auh | G06F 21/602 |

* cited by examiner

METHODS AND SYSTEMS FOR EFFICIENT ENCODING AND DECODING COMMUNICATIONS

CROSS-REFERENCE TO RELATED APPLICATIONS

This application claims the benefit of U.S. Provisional Application No. 62/731,637, filed Sep. 14, 2018 and entitled "METHODS AND SYSTEMS FOR ENCODING AND DECODING COMMUNICATIONS", U.S. Provisional Application No. 62/731,714, filed Sep. 14, 2018 and entitled "METHODS AND SYSTEMS FOR CUSTOMIZED ENCODING AND DECODING COMMUNICATIONS", U.S. Provisional Application No. 62/811,249, filed Feb. 27, 2019 and entitled "METHODS AND SYSTEMS FOR EFFICIENT ENCODING AND DECODING COMMUNICATIONS", and U.S. Provisional Application No. 62/845,757, filed May 9, 2019 and entitled "METHODS AND SYSTEMS FOR EFFICIENT ENCODING AND DECODING COMMUNICATIONS", the disclosures of which are hereby incorporated by reference in their entireties for all purposes.

TECHNICAL FIELD

Certain aspects of the present disclosure generally relate to networked and non-networked communications, and more specifically, to devices, systems, and methods related to networked and non-networked communications where data throughput, power consumption, and security are critical measures of performance.

BACKGROUND

In many communication systems, communications networks are used to exchange messages among several interacting spatially-separated devices. Networks may be classified according to geographic scope, which could be, for example, a metropolitan area, a local area, or a personal area. Such networks are generally designated respectively as a wide area network (WAN), metropolitan area network (MAN), local area network (LAN), or personal area network (PAN). Networks also differ according to the switching/routing technique used to interconnect the various network nodes and devices (for example, circuit switching vs. packet switching), the type of physical media employed for transmission (for example, wired vs. wireless), and the set of communication protocols used (for example, Internet protocol suite, SONET (Synchronous Optical Networking), Ethernet, etc.). In some communication systems, the networks include any number of spatially-separated devices, some of which that are separated by as much as many miles or a little as a few inches. In some communication systems, non-networked communications (for example, radio communications) may exist between two communication nodes that are not part of a communications network. Such non-networked communications may include point-to-point, point-to-multipoint, or broadcast connections.

Wireless networks are preferred when the network elements are mobile and thus have dynamic connectivity needs, or if the network architecture is formed in an ad hoc topology. Wired preferred when the network elements are stationary and thus have fixed or constant connectivity needs, or if the network architecture is formed in a fixed topology. Wireless networks employ intangible physical media in an unguided propagation mode using electromagnetic waves in the radio, microwave, infra-red, optical, etc. frequency bands, while wired networks employ tangible physical media, such as copper, conductive, or fiber optic cables. Wireless networks advantageously facilitate user mobility and rapid field deployment when compared to fixed wired networks.

In some aspects, communication networks may be encrypted and parameters related to encryption scheme used in relation with the communication networks may be communicated via the communication networks. Devices, systems, and methods of effecting such communication of encryption scheme parameters are desired.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In some aspects, an apparatus for encoding a stream of data for transmission to a receiver device is provided. The apparatus comprises a memory device configured to store at least one parameter associated with at least one cryptographic protocol. The at least one parameter identifies one or more cipher directives from a plurality of cipher directives including an exclusive-OR (XOR) function and a table lookup function. The apparatus further comprises a hardware processor configured to generate, for transmission to the receiver device, a frame comprising a first field identifying a custom or non-custom cryptographic scheme and a second field identifying a first cipher directive of the plurality of cipher directives.

In another aspect, an apparatus for encoding a stream of data for transmission to a receiver device is provided. The apparatus comprises means for storing at least one parameter associated with at least one cryptographic protocol. The at least one parameter identifies one or more cipher directives from a plurality of cipher directives including an exclusive-OR (XOR) function and a table lookup function. The apparatus further comprises means for generating, for transmission to the receiver device, a frame comprising a first field identifying a custom or non-custom cryptographic scheme and a second field identifying a first cipher directive of the plurality of cipher directives. The frame is associated with the data encoded for transmission to the receiver device.

In another aspect, a method for encoding a stream of data for transmission to a receiver device is provided. The method comprises storing at least one parameter associated with at least one cryptographic protocol, the at least one parameter identifying one or more cipher directives from a plurality of cipher directives including an exclusive-OR (XOR) function and a table lookup function. The method further comprises generating, for transmission to the receiver device, a frame comprising a first field identifying a custom or non-custom cryptographic scheme and a second field identifying a first cipher directive of the plurality of cipher directives. The frame is associated with the data encoded for transmission to the receiver device.

In another aspect, a non-transitory computer-readable medium comprising code is further provided. When the code is executed, the code causes an apparatus to store at least one parameter associated with at least one cryptographic protocol, the at least one parameter identifying one or more cipher directives from a plurality of cipher directives including an exclusive-OR (XOR) function and a table lookup function. When the code is executed, the code further causes the apparatus to generate, for transmission to the receiver device, a frame comprising a first field identifying a custom or non-custom cryptographic scheme and a second field identifying a first cipher directive of the plurality of cipher directives. The frame is associated with the data encoded for transmission to the receiver device.

Figure 1:
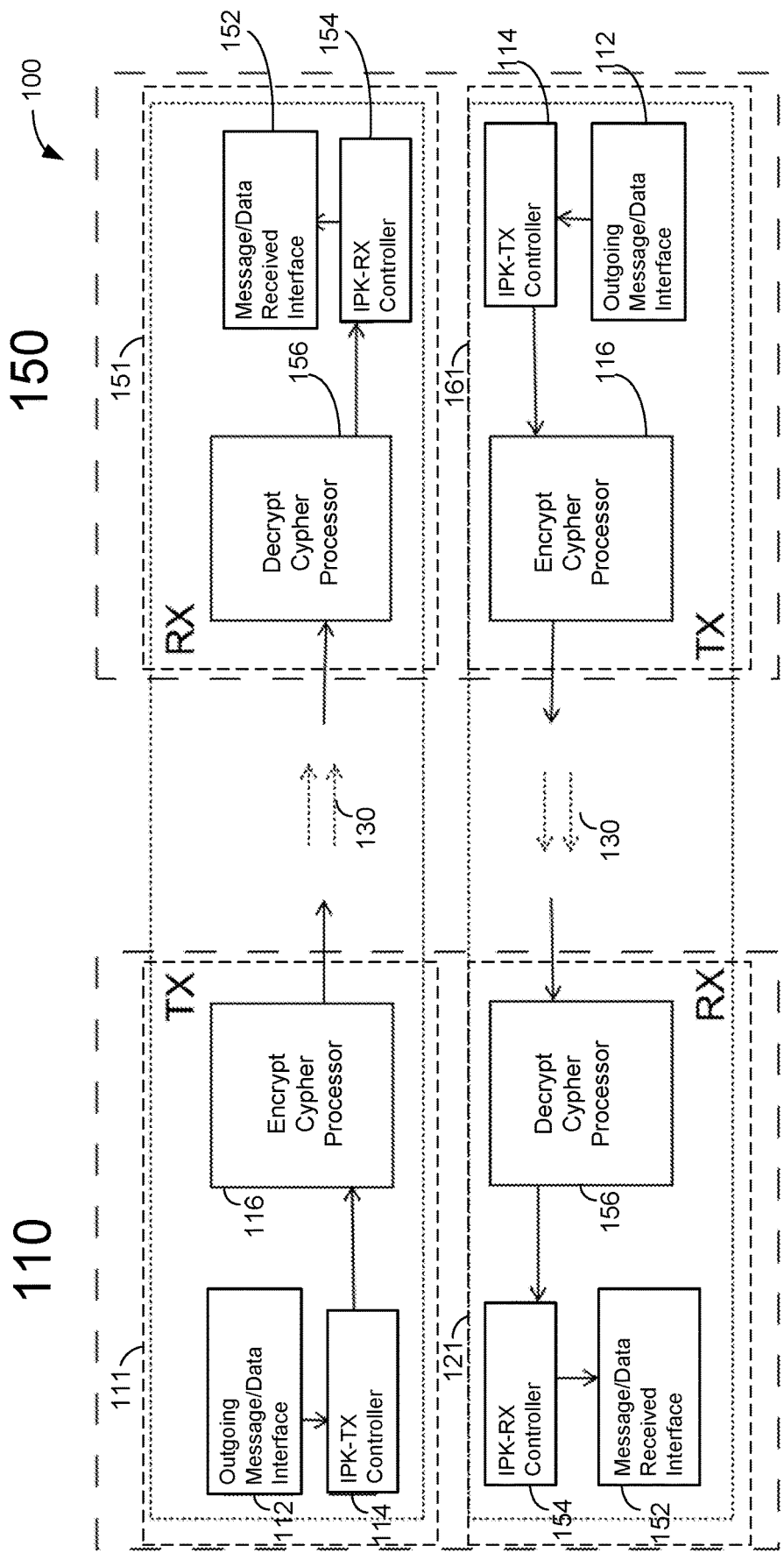
FIG. 1 is a functional block diagram of a loosely coupled intelligent private key (IPK) encryption system including communications between a first transceiver and a second transceiver, in accordance with some implementations.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Various aspects of the novel systems, apparatuses, and methods are described more fully hereinafter with reference to the accompanying drawings. The teachings in this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The teachings herein may be incorporated into (for example, implemented within or performed by) a variety of wired or wireless communication networks that allow communication between apparatuses or devices (for example, nodes). In some aspects, the devices utilizing the teachings herein may communicate via a peer-to-peer (P2P) network, an ad-hoc network, cellular or mobile communication networks, or a client-server network. In some aspects, the devices utilizing the teachings herein may communicate via point-to-point, point-to-multipoint, and/or broadcast connections at very high frequencies (for example, VHF radio) with or without repeaters. Accordingly, each device may communicate with one or more other devices via a wired or wireless medium. In some implementations, one or more of the devices comprises a computer (for example, a laptop or a desktop), a phone (for example, a mobile phone, a cellular telephone, a smartphone, a cordless telephone, a Session Initiation Protocol (SIP) phone, and so forth) a wireless local loop (WLL) station, a handheld device having wireless connection capability, a headset, a portable computing device (for example, a personal data assistant or a tablet), an entertainment device (for example, a music or video device, or a satellite radio), a gaming device or system, a global positioning system device, a drone, an unmanned aerial vehicle (UAV), or any other suitable device that is configured to communicate via a wired or wireless communication network or medium.

Exemplary Encryption Schemes

In the communication network described above, devices may encode communications and transmissions between themselves using one or more encoding schemes that include one or more authentication mechanisms, authorization mechanisms, and encryption algorithms or ciphers. The term encryption protocol generally refers to an encryption algorithm. The term encryption system generally refers to both symmetric and asymmetric encryption schemes. The description below assumes that a cryptographic key is a pseudo-random number (PRN) sequence of bits.

For example, an Internet Protocol Security (IPSec) encryption scheme uses cryptographic techniques such as Pre-Shared Key (PSK) for authentication, Advance Encryption Standard (AES) (for example, encryption algorithms or ciphers) to encrypt the transmission through use of a symmetric session key, and other well-known techniques. IPSec, or any other similar scheme, utilizes the issuance of updated session keys on a regular basis to maintain security and integrity of the transmission. For example, IPSec refreshes session keys approximately every 20 minutes using a Diffie-Hellman Key Exchange or similar protocol to exchange a symmetric encryption key (i.e., the updated session key). Such periodic refreshes introduce overhead in the IPSec encryption scheme. For example, the devices utilizing the IPSec encryption scheme may suffer through communication and processing delays (i.e., caused by the communication and processing overhead) at these 20 minute intervals as the session keys are refreshed.

Intelligent Private Key (IPK)

This disclosure describes an Intelligent Private Key (IPK) frame structure (or message or other corresponding data transmission structure used in either a packetized or non-packetized communication) that may augment and enhance the above described communication networks, especially those that use protocols where data is transmitted and received in packets (for example, data packets). However, the IPK frame structure described below is not limited to packet-based protocols.

The IPK frame structure described below may coexist with existing authentication mechanisms, authorization mechanisms, and encryption algorithms or ciphers as part of comprehensive authentication, authorization, encryption and encoding schemes. The IPK frame structure may also coexist with the cryptographic key (for example, the PRN described above). A combination of these mechanisms, algorithms, and/or ciphers is generally referred to, in total, as a cryptographic scheme. In some implementations, the IPK frame structure augments the cryptographic scheme to enhance and strengthen security and/or create an ecosystem to perform a variety of device to device, multi-cast or broadcast functions such as command/status, network, and communication.

Transmitting and receiving devices described herein may encrypt/decrypt the below described IPK frame structure like data and may transmit/receive the IPK frame structure with or without data. In this instance, the IPK frame structure is "loosely coupled" to the PRN key. In other words, the loosely coupled IPK frame structure is only logically connected to the PRN key. In some embodiments, the loosely coupled IPK frame structure is logically connected or coupled to one or more of any cryptographic key, a cipher engine, and/or message/data. In other embodiments, an encryption/decryption algorithm may fully merge the IPK frame structure bits with the PRN key bits and then pass the IPK frame structure bits for encryption/decryption by one or more cipher processors. In this instance the IPK frame structure is "tightly coupled" to the PRN key. In other words, the tightly coupled IPK frame structure is both logically and physically connected to the PRN key. In some embodiments, the tightly coupled IPK frame structure is logically and physically connected or coupled to one or more of any cryptographic key, the cipher engine, and/or message/data. In either of the loosely coupled or tightly coupled embodiments, one or more aspects of the cryptographic scheme may change, or hop, as necessary depending on a variety of system requirements such as security, power, or performance. Such changing or hopping is generally referred to as "cryptohopping". Further details regarding the IPK frame structure and systems utilizing the IPK frame structure (for example, an IPK system) are provided below in relation to FIGS. 1-6.

Exemplary IPK Encryption System

Information (for example, message and/or data) is transmitted from a transmitter device to a receiver device in the communication network in transmissions. The transmissions are encrypted according to the cryptographic scheme for the communication network or for the communicating devices. In some implementations, the IPK frame structure of the IPK system modifies any aspect of a cryptographic key, including, but not limited to, PRN derived encryption key content and key length. The IPK frame may be described with reference to the cryptographic or encryption key and modifications or changes thereto but applies equally to the cipher engine and/or message/data protocols. The IPK frame structure may also facilitate a switch between different encryption and encoding schemes (for example, including industry standard and customized encryption and encoding schemes).

Exemplary Loosely Coupled IPK Encryption System

FIG. 1 is a functional block diagram of a loosely coupled intelligent private key (IPK) encryption system 100 that provides communications between a first transceiver (for example, a source device) 110 and a second transceiver (for example, a destination device) 150, in accordance with some implementations. The first transceiver 110 includes a transmitter 111 and a receiver 121. The transmitter 111 includes an outgoing message/data interface 112 that provides an output that feeds an IPK-TX controller 114. The IPK-TX controller 114 then provides an output that feeds an encrypt cipher processor 116. The encrypt cipher processor 116 generates an output for the transmitter 111 of the first transceiver 110. The output of the first transceiver 110 is transmitted and/or communicated, via a communication medium 130, as an input to the second transceiver 150, which includes a receiver 151 and a transmitter 161 (described in further detail below). In some embodiments, the communication medium 130 comprises a wired interface or medium in wired communication networks or segments or a wireless interface or medium in wireless communication networks or segments. Transmissions (for example, messages) between the first transceiver 110 and the second transceiver 150 may include a header portion and a payload portion. In some embodiments, transmissions between the first and second transceivers 110 and 150 (or 410 and 450 introduced below) may occur in binary, or Base 2. The header portion generally identifies one or more parameters or aspects identifying information for one or more of the sender, receiver, and message. The payload portion generally includes the data or information of interest that is being communicated in the message.

The top half of FIG. 1 shows a first data flow path when sending an outgoing message or data from the first transceiver 110 to the second transceiver 150 (first transceiver transmitter 111 to second transceiver receiver 151). The bottom half of FIG. 1 shows a second data flow path when sending a second outgoing message or data from the second transceiver 150 to the first transceiver 110 (second transceiver transmitter 161 to first transceiver receiver 121).

As shown in FIG. 1, the outgoing message/data interface 112 comprises a user interface, a memory unit, or a similar input interface. The outgoing message/data interface 112 identifies or otherwise determines, obtains, or stores outgoing message or data information that is transmitted from the first transceiver 110 to the second transceiver 150. In some embodiments, the outgoing message/data interface 112 generates the outgoing message or data to be transmitted by the first transceiver 110, which is conveyed from the outgoing message/data interface 112 to the IPK-TX controller 114.

The IPK-TX controller 114 receives the outgoing message or data from the outgoing message/data interface 112. The IPK-TX controller 114 may comprise a hardware controller, processor circuit, or similar circuit. The IPK-TX controller 114 generates a loosely coupled IPK frame structure that identifies the information and directives for the encryption scheme. Details of the loosely coupled IPK frame structure are described in further detail in FIG. 2. The IPK-TX controller 114 then appends or concatenates the generated loosely coupled IPK frame structure with the outgoing message or data to generate an appended IPK/Message/Data. The term concatenate generally refers to linking (for example, bits, fields, etc.) together in a chain or series. The IPK-TX controller 114 provides an output comprising the appended IPK/Message/Data that feeds into the encrypt cipher processor 116.

In some embodiments, the first transceiver 110 and/or the second transceiver 150 comprise means for storing a plurality of parameters associated with a plurality of cryptographic protocols, the plurality of parameters comprising the initial common cryptographic key. In certain implementations, the means for storing the plurality of parameters is implemented by the IPK-TX controller 114 or the IPK-RX controller 154. In some implementations, the means for storing the plurality of parameters is implemented by one or more of the components of the IPK-TX controller 114, as described in further detail in FIG. 3 below. In certain implementations, the means for storing the plurality of parameters is configured to perform the functions of block 805, as described below with reference to FIG. 8.

Furthermore, the first transceiver 110 and/or the second transceiver 150 comprise means for generating a frame comprising a plurality of fields defining instructions related one or more of a first cryptographic scheme, a first cryptographic key operation, a first cryptographic key length, and a first cipher directive that are derived from the plurality of parameters for use in a subsequent communication session with the receiver device. In certain implementations, the means for generating the frame is implemented by one or more of the IPK-TX controller 114 or the IPK-RX controller 154. In certain implementations, the means for generating the frame is implemented by one or more of the components of the IPK-TX controller 114, as described in further detail in FIG. 3 below. In certain implementations, the means for generating the frame is configured to perform the functions of block 810, as described below with reference to FIG. 8.

The encrypt cipher processor 116 receives the appended IPK/Message/Data from the IPK-TX controller 114. The encrypt cipher processor 116 may comprise a hardware controller, processor circuit, engine, or a similar circuit. The encrypt cipher processor 116 may encrypt the appended IPK/Message/Data for transmission by the transmitter 111.

The receiver 151 of the second transceiver 150 includes a decrypt cipher processor 156 that receives an input from the communication medium 130 and provides an output that feeds an IPK-RX controller 154. The IPK-RX controller 154 provides an output that feeds a received message/data interface 152. Details of the receiver 151 are described below.

The decrypt cipher processor 156 receives the encrypted IPK/Message/Data from the encrypt processor 126 of the transmitter 111 via the communication medium 130. The decrypt cipher processor 156 may comprise a hardware controller, processor, or a similar circuit. The decrypt cipher processor 156 decrypts the encrypted IPK/Message/Data, if applicable, for further processing by the receiver 151. The decrypt cipher processor 156 outputs the decrypted IPK/Message/Data to the IPK-RX controller 154.

The IPK-RX controller 154 separates or parses the loosely coupled IPK frame structure from the message or data as received in the decrypted IPK/Message/Data from the decrypt cipher processor 156. The IPK-RX controller 154 then passes the message or data to the received message/data interface 152. The second transceiver 150 now has the received message.

The bottom half of FIG. 1, which shows the sending of a second message or data from the second transceiver 150 to the first transceiver 110, works exactly the same as described with reference to the top half of FIG. 1, but in reverse. Similar components between the second transceiver 150 and the first transceiver 110 are identified as such for clarity and convenience. In some embodiments, the message or data is null or the first transceiver 110 and second transceiver 150 only communicate IPK frame structure related changes.

In some embodiments, the first transceiver 110 and second transceiver 150 includes an IPK configuration module, instruction, or functionality. The IPK configuration module (not shown in the figures) may ensure that the first transceiver 110 and the second transceiver 150 (and any other communicating devices in the communication network) have available similar IPK frame structure and system options and correlating IPK frame structures. Accordingly, the IPK configuration modules enable the first transceiver 110 and the second transceiver 150 to communicate with each other utilizing the IPK frame structure and/or system described herein.

In some embodiments, the IPK configuration module operates at an initial startup or initialization of the IPK system and/or one or more of the first transceiver 110 and the second transceiver 150. For example, the first transceiver 110 determines to begin encrypted communications using the IPK frame structure on the communication network with the second transceiver 150 (or another device). Before the encrypted communications using the IPK frame structure can begin, both of the first transceiver 110 and second transceiver 150 may ensure they have the same IPK system options and correlating IPK frame structures. Both the first transceiver 110 and the second transceiver 150 may obtain master libraries from a central service or device or from each other. Having the same master libraries ensures that the first transceiver 110 and the second transceiver 150 have the same IPK system options and correlating IPK frame structures. The first transceiver 110 and the second transceiver 150 may securely share the master libraries, which may contain all available options and/or boundaries for the IPK frame structure and system. For example, the master libraries include all options for encryption schemes, cipher directives (if applicable), key operations, key length, control and/or status bits, and other relevant data or information.

In addition to obtaining the master libraries, the IPK configuration module may identify or establish an order of fields for the IPK frame structure to be used in the encrypted communications between the first transceiver 110 and the second transceiver 150. Similarly, the IPK configuration module may further identify or establish a size for each of the fields included in the IPK frame structure. Additionally, the IPK configuration module may map or assign bits for each of the fields in the IPK frame structure to corresponding options in the master libraries, as appropriate for each field in the IPK frame structure. For example, the IPK configuration module maps values for a single bit encryption scheme field such that "0" in the encryption scheme field identifies a "NULL" encryption scheme while "1" identifies a "RC5" encryption scheme. Similarly, the IPK configuration module may map values for each of the cipher directives (if applicable), key operations, and control and/or status fields. In some embodiments, the field ordering and assignment of field bits is specifically assigned or chosen at random. Additionally, the field bit size may be specifically assigned. An initial IPK structure and an initial cryptographic key may be shared with the first transceiver 110 and the second transceiver 150 via a secure communication means, for example, via the Diffie-Hellman (or similar) key exchange protocol. The number of bits of the initial cryptographic key may identify a maximum key length, as indicated in the IPK frame structure.

In some embodiments, the first transceiver 110 and second transceiver 150 includes an IPK redefinition module, instruction, or functionality. The IPK redefinition module (not shown in the figures) may enable either or both of the first transceiver 110 and the second transceiver 150 (and any other communicating devices in the communication network) to request that the IPK frame structure be redefined and correlated between all communicating devices.

In some embodiments, the IPK redefinition module operates any time after the initial configuration of the IPK system. For example, one of the first transceiver 110 and the second transceiver 150 requests for redefinition of the IPK frame structure. In some embodiments, any device is limited in when it can request for redefinition of the IPK frame structure based on the current communication algorithm employed. For example, in a ping-pong algorithm described below, the second transceiver 150 is not able to request redefinition of the IPK frame structure being used while communications based on the IPK frame structure defined by the second transceiver 150 are occurring. Generally, redefinition of the IPK frame structure cannot occur while the communication algorithms described herein (and similar or other algorithms) are in operation.

The field re-ordering and/or re-assignment may be performed at random or specifically re-assigned. For example, the request for the redefinition of the IPK frame structure identifies a desired order of fields. Alternatively, or additionally, the request for the redefinition of the IPK frame structure also includes a request to re-assign the field bit size. In some embodiments, the request for the redefinition of the IPK frame structure requests that one or more of the field reordering, field reassignment, and field bit size reassignment be performed. Once the IPK frame structure is redefined, the redefined IPK frame structure may be shared among the communicating device via a secure means, for example, via the Diffie-Hellman (or similar) key exchange protocol.

In some embodiments, the cryptographic key is updated between the communicating first transceiver 110 and the second transceiver 150. The first transceiver 110 and the second transceiver 150 may have the same maximum key length cryptographic key (for example, the same initial cryptographic key). The cryptographic key utilized by the first transceiver 110 and the second transceiver 150 may be correlated between the first transceiver 110 and the second transceiver 150 to ensure proper operation of the IPK frame structure and encryption operations in the IPK system when the cryptographic key is less than the maximum key length. The cryptographic key may be updated by (1) updating the entire cryptographic key based on a current "key operation" and/or (2) by updating a portion of the cryptographic key based on the current "key operation" and maintain remaining portions of the cryptographic key.

A similar configuration module and/or redefinition module may exist for the first transceiver 410 and second transceiver 450 described in relation to FIGS. 4-6 below.

Exemplary IPK Frame Structure in Loosely Coupled Encryption System

As described above, the loosely coupled IPK frame structure can enhance security, for example by changing one or more of the encryption scheme, key operation, and key length. For example, the IPK-TX controller 114 and/or the encrypt cipher processor 116 may "change" the IPK frame structure 200 by adding or removing a field from the IPK frame structure. Alternatively, or additionally, the IPK-TX controller 114 and/or the encrypt cipher processor 116 may change a value in the IPK frame structure 200, for example a value in one of the fields of the IPK frame structure 200. The loosely coupled IPK frame structure also provides the first transceiver 110 and the second transceiver 150 an ability to pass control and status functionality. Details regarding the loosely coupled IPK frame structure are provided below.

Figure 2:
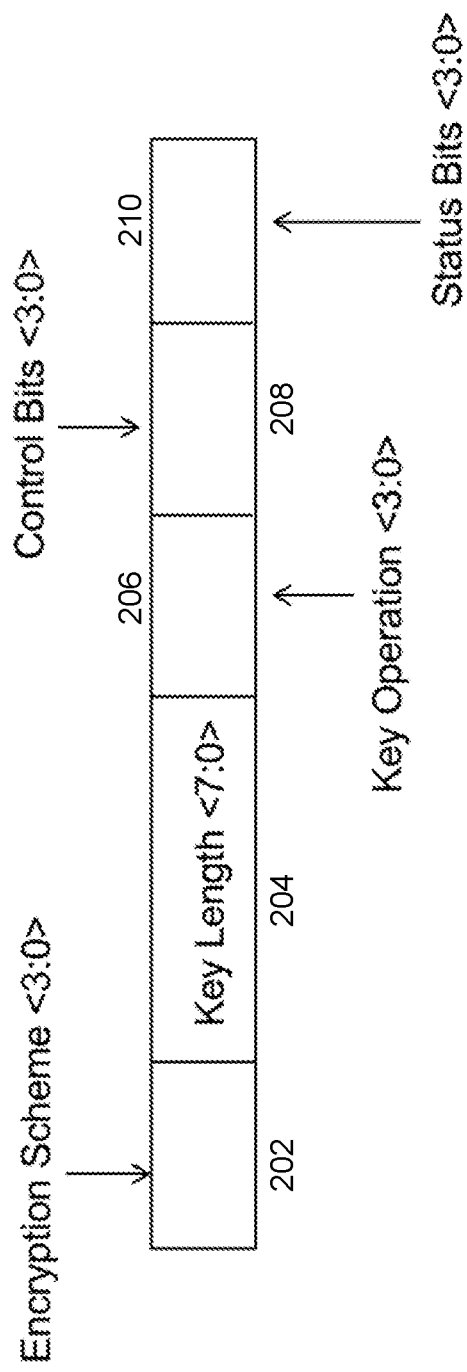
FIG. 2 shows a diagram of an exemplary loosely coupled IPK frame structure for use in the loosely coupled IPK encryption system of FIG. 1.

FIG. 2 shows a diagram of an exemplary loosely coupled IPK frame structure 200 for use in the loosely coupled IPK encryption system 100 of FIG. 1. The term "loosely coupled" generally refers to the logical coupling of the IPK frame structure 200 to the PRN key, as described above. The loosely coupled IPK frame structure 200 may provide for reconfiguration (or switching) of the encryption scheme, key operations, and/or key length operating for communications between the first transceiver 110 and the second transceiver 150 to any supported industry standard encryption scheme. The loosely coupled IPK frame structure 200 may identify and/or modify industry standard encryption schemes and may not be intended to support non-industry standard encryption schemes or configurations. The transmitter 110 may transmit the loosely coupled IPK frame structure 200 as a message somewhere in the transmission stream between the first transceiver 110 and the second transceiver 150 described above with reference to FIG. 1.

As shown in FIG. 2, the loosely coupled IPK frame structure 200 includes five (5) different fields, each including one or more bits. From left to right, the loosely coupled IPK frame structure 200 includes an encryption scheme field 202 having a length of four (4) bits, a key length field 204 having a length of eight (8) bits, a key operation field 206 having a length of four (4) bits, a control field 208 having a length of four (4) bits, and a status field 210 having a length of four (4) bits. As shown in FIG. 2 and used herein, the notation <X:0> represents a size (in bits) for a particular field. For example, the encryption scheme field 202 is shown with the notation <3:0> to identify that the size of the encryption scheme field 202 is four bits. The X in the <X:0> notation corresponds to the most significant bit position of the corresponding field and the 0 corresponds to the least significant bit of the corresponding field. Thus, the notation <7:0> for the key length field 204 indicates that the key length field 204 has a size of eight bits. In some implementations, an arrangement of the fields of the loosely coupled IPK frame structure 200 is different for different encryption systems based on the system and security requirements for the different systems. Thus, the loosely coupled IPK frame structure 200 may include a different number of fields, different fields, different arrangement of fields, or different field lengths than those shown in FIG. 2. For example, the different fields of the loosely coupled IPK frame structure 200 include any field length from, for example, one (1) bit to eight (8) bits, or any larger number of bits. In some embodiments, the loosely coupled IPK frame structure 200 is generated by the IPK-TX controller 114 of the first transceiver 110 for transmission to the second transceiver 150. For example, a value of one or more of the fields of the loosely coupled IPK frame structure 200 is set or generated by the IPK-TX controller 114 based on one or more inputs or determinations, as described in further detail with reference to FIG. 3.

In some embodiments, one or more values of the fields of the loosely coupled IPK frame structure 200 may be changed as often as every communication transmitted by the first transceiver 110. Details of how values are assigned to the fields 202-210 and/or how the loosely coupled IPK frame structure 200 is generated are described in further detail with regard to FIG. 3 below. The loosely coupled IPK frame structure 200 could be used for any combination of the following functions. Other functions may be defined and/or redefined as other features are needed.

A value in the encryption scheme field 202 is generated, provided, or set by the IPK-TX controller 114. Encryption scheme bits included therein define or instruct available encryption/decryption options supported by the encrypt/decrypt cipher processors 116 and 156, respectively, as described above in FIG. 1. For example, the four bits of the encryption scheme field 202 allow the encryption scheme field 202 to set the encryption scheme for the cipher processors 116 and 156.

Table 1 below identifies exemplary encryption schemes and corresponding encryption scheme field 202 values. The encryption schemes identified in Table 1 include only a list of industry standard encryption schemes that the encrypt cipher processor 116 and/or decrypt cipher processor 156 are capable of handling.

TABLE 1

| Encryption Scheme<3:0> | Specific Operation |
| --- | --- |
| 0000 | NULL |
| 0001 | 3DES |
| 0010 | RC5 |
| 0011 | AES_CBC |
| 0100 | AES_CTR |
| 0101 | AES_CCM_12 |
| 0110 | AES_CCM_16 |
| 0111 | AES_GCM_12 |
| 1000 | AES_GCM_16 |
| 1001 | NULL_AUTH_AES_GMAC |
| 1010 | CAMELLIA_CBC |
| 1011 | CAMELLIA_CTR |
| 1100 | CAMELLIA_CCM_12 |
| 1101 | CAMELLIA_CCM_16 |
| 1110 | AES_CCM_8_IIV |
| 1111 | GCM_16_IIV |

A value of the key length field 204 is generated, provided, or set by the IPK-TX controller 114. Key length bits included therein define or instruct the length of the PRN key. The key length identified in the key length field 204 can remain the same or change to a different length. For example, in AES encryption, the PRN key length could change between any of 256, 192 and 128, individually or according to any pattern. In some embodiments, a value of the key length field 204 identifies the length of the PRN key from 1-256 bits. For example, a value of "0" in the key length field 204 represents a PRN key length of "1" bit while a value of "255" in the key length field 204 represents a PRN key length of "256" bits. In some embodiments, a value of the key length field 204 identifies the length of the PRN key from 1-256 bits or a set shorter key length to meet security requirements. In some embodiments, the key length field 204 identifies the length of the PRN key that is greater than 256 bits when the key length field 204 is sized accordingly. In some embodiments, key lengths could be devised or determined on non-byte boundaries in coordination with appropriate encryption/decryption cipher processors.

A value of the key operation field 206 is generated, provided, or set by the IPK-TX controller 114. Key operation bits included therein define or instruct to perform various logical and/or arithmetic operations on the PRN Key, for example by the encrypt cipher processor 116 (or decrypt cipher processor 156). For example, the key operation field 206 indicates to the second transceiver 150 that the decrypt cipher processor 156 is to perform one or more of bit complementing, shifting, swapping, and reversing individually or in various combinations on the PRN key to enhance security. The four bits allow the key operation field 206 to set the key operations for the encrypt/decrypt cipher processors 116 and 156 to perform on the PRN key. Table 2 below identifies exemplary key operations and corresponding key operation field 206 values:

TABLE 2

| Key Op<3:0> | Specific Operation |
| --- | --- |
| 0000 | Do nothing |
| 0001 | Complement all bits |
| 0010 | Complement every other bit |
| 0011 | Complement every $7^{th}$ bit |
| 0100 | Swap adjacent bytes |
| 0101 | Swap adjacent words |
| 0110 | Swap adjacent dwords |
| 0111 | Shift left 32 bits |
| 1000 | Shift left 47 bits |
| 1001 | Shift right 23 bits |
| 1010 | Shift right 9 bits |
| 1011 | Reverse all bits |
| 1100 | Reverse bits 9-23 |
| 1101 | Reverse bits 119-272 |
| 1110 | Complement every other bit and swap adjacent bytes |
| 1111 | Shift left 6 bits and reverse bits 16-31 |

Values of the control bits field 208 and the status bits field 210 are passed, generated, provided, or set by the IPK-TX controller 114. The control bits field 208 and the status bits field 210 pass or generate control and status information, respectively, to target devices, such as the second transceiver 150. The control bits included in the control bits field 208 may instruct the second transceiver 150 (and similar devices) to perform certain tasks. The status bits included in the status bits field 210 may provide status regarding certain things in an environment, for example, of the second transceiver 150, such as the first transceiver 110 or an external device.

Furthermore, in some embodiments, the control bits and/or the status bits include data to manage and/or maintain various aspects of the IPK encryption system 100. For example, the control and/or status bits include data regarding a wide range of functions or data such as network function (including, but not limited to, IP address, topology, protocol, configuration, and device management), payload data, block chain, modulation/constellation schemes, forward error correction, Artificial Intelligence (AI), fuzzy logic, and signal/noise (information, analysis, processing and feedback). Although this description does not use "data" that would be maintained as part of the IPK, one could define a wide range of applications to exploit this.

As discussed above, the IPK frame structure 200 may be applied in a wide range of communication systems (for example, telecommunication, satellite, GPS, PAN, LAN, MAN, and/or WAN systems) with wired and wireless communications protocols (for example, LTE, 5G, Wi-Fi, Bluetooth, and/or ZigBee protocols). The strategic definition and use of the control and status bits fields 208 and 210 of the IPK frame structure 200 for a given communication system and protocol(s) can be a very efficient and effective way to manage various aspects of the communication system. Coupling the control and status bits control and status bits fields 208 and 210 to the cryptographic functions of the IPK frame structure 200 is not required, but the security gained in protecting the communication system from outside attacks is extremely beneficial. The use of the control and status bits with communication protocols may be divided into two types: signal processing/communication (SP/Comm) and subsystem components. The signal processing/communication type relates to various aspects of the communication protocols, such as the modulation/constellation schemes. The subsystem components type relates to management of the various hardware elements in the IPK system.

In an exemplary embodiment, a wireless handset that utilizes LTE communication protocols can demonstrate the use of the control and status bits as part of control and status bits fields 208 and 210 in the IPK frame structure 200. Furthermore, the control and status bits fields 208 and 210 may be used to control how the IPK system makes changes to other fields that could be defined as part of the IPK frame structure 200. For example, the control and status bits of the IPK frame structure 200 may be used to communicate specifics of signal processing/communication (SP/Comm):

Modulation/Constellation Schemes—The control bits of the control bits field 208 may be defined to correlate to a library of modulation/constellation schemes for both encoding and decoding. By selecting different bit combinations, the IPK system can change the modulation/constellation scheme based on a variety of environmental requirements and conditions to achieve optimal communications.

Code Rate and Noise Tolerance—The control bits of the control bits field 208 may be defined to identify a specific data transfer Code Rate and environmental Noise Tolerance. The selection of the Code Rate and Noise Tolerance control bits can be used to optimize communication in addition to optimizing the modulation/constellation scheme selection.

Bit Error Rate (BER) feedback—The status bits of the status bits field 210 may correlate to real time BER feedback that can be used for various system decisions, including modulation/constellation scheme and code rate and noise tolerance selection. The BER feedback status bits can be stored for later use in trend analysis and modulation/constellation selection change prediction.

Re-transmit Requests—The status bits of the status bits field 210 may keep track of the number of re-transmit requests, which is useful for modulation/constellation scheme and code rate and noise tolerance selection.

In another example, the control and status bits of the IPK frame structure 200 may be used to communicate specifics of subsystem control functions (of, for example, the wireless LTE handset), for example:

RF band selection based on LTE band.
Low Noise Amplifier (LNA) selection based on LTE band and environment.
Power Amplifier (PA) selection based on LTE band and environment.
Digital Signal Processor (DSP) control.
Applications Processor (AP) control.

In some embodiments, the IPK frame structure 200 also includes one or more additional fields that also defines nesting of keys, provides a definition of sub-keys, provides a re-definition of key operations (for example, what value(s) in the key operation field 206 correspond to a particular key operation), and cipher-specific directives. The one or more additional fields also defines a signature, such as a CRC signature, to expedite authentication. In some embodiments, a completely new PRN key could also be embedded in the loosely coupled IPK frame structure 200 in an additional field.

As indicated in the description above, the loosely coupled IPK frame structure 200 provides several advantages and benefits. For instance, because the values of the fields within the loosely coupled IPK frame structure 200 can be changed by the transceivers 110 and 150, the loosely coupled IPK frame structure 200 and IPK encryption system 100 provide a flexible framework that is easily varied depending upon requirements of a particular application or system in which the loosely coupled IPK frame structure 200 is implemented. The flexible loosely coupled IPK frame structure 200 and IPK encryption system 100 may increase security and robustness of communications between the transmitter 110 and receiver 120.

The loosely coupled IPK frame structure 200 described above provides a flexible framework that can be based on specific requirements of the IPK encryption system 100. The loosely coupled IPK frame structure 200 and IPK encryption system 100 may be designed to optimize security, performance, and power requirements, which may be in conflict in their nature and implementation. The loosely coupled IPK frame structure 200 and IPK encryption system 100 may include the ability to define the loosely coupled IPK frame structure with provisions for changing any form of a cryptographic key including, but not limited to, encryption key content as derived from the PRN, the key length, and encryption/decryption cipher directives. As such, the loosely coupled IPK frame structure 200 may augment existing cryptographic methods and algorithms. In some embodiments, the IPK frame structure could be tightly coupled to (for example, communicated with and/or connected to) the PRN derived encryption. The encrypt/decrypt cipher processor 116 and 156 may accommodate all of these features of the loosely coupled IPK frame structure and system.

The IPK frame structure 200 introduces functions, operations, and/or techniques to minimize, or in some instances eliminate, the new session key refresh. The IPK frame structure 200 also significantly enhances security while providing a centralized infrastructure for a wide range of functions including command/status, network, and communications. Unique to the IPK frame structure 200, and IPK encryption systems 100 that utilize the IPK frame structure 200, is the coupling of security enhancements with these other command, control, and communications functions. The IPK frame structure 200 or IPK encryption system 100 may provide the ability to modify one or more of a cryptographic scheme, encryption key contents, and encryption key length offer enhanced flexibility and increased security.

Furthermore, in the communication network using IPSec encryption schemes as described above, the 20-minute periods between key refreshes may encompass times when an unauthorized, or hacking, entity tries to hack into the system. The hacking entity may intercept a message and identify the relevant key and encryption information and use that information to intercept communications before the 20-minute refresh time ends. However, in the IPK encryption system 100, because the first transceiver 110 and the second transceiver 150 may change or hop between one or more of encryption schemes, key lengths, and key operations as often as every communication message or session (for example, as described below with reference to the communication algorithms), the hacking entity is further thwarted. By the time the hacking entity is able to identify the relevant key, etc., the key, and other associated information, will have changed in the IPK encryption system 100 (for example, due to the hopping) since new communication messages or sessions are being communicated with potentially new key lengths, encryption schemes, key operations, and so forth.

The loosely coupled IPK frame structure 200 may be introduced to perform security and additional functions within a legacy cryptographic schema for authentication, authorization, encryption and encoding. In this instance, the loosely coupled IPK frame structure 200 and the PRN derived encryption key work in concert although not tightly coupled.

Exemplary IPK-TX and IPK-RX Controllers for Loosely Coupled IPKs

As described above in relation to FIGS. 1 and 2, the IPK-TX controller 114 of the first transceiver 110 includes various components and functions that identify and/or generate the loosely coupled IPK frame structure 200 and the transmission to the second transceiver 150. Similarly, the IPK-RX controller 154 of the second transceiver 150 includes various components and functions regarding the transmission received from the first transceiver 110. The structures and functions of the components of the IPK-TX controller 114 and the IPK-RX controller 154 are now described in further detail.

Figure 3:
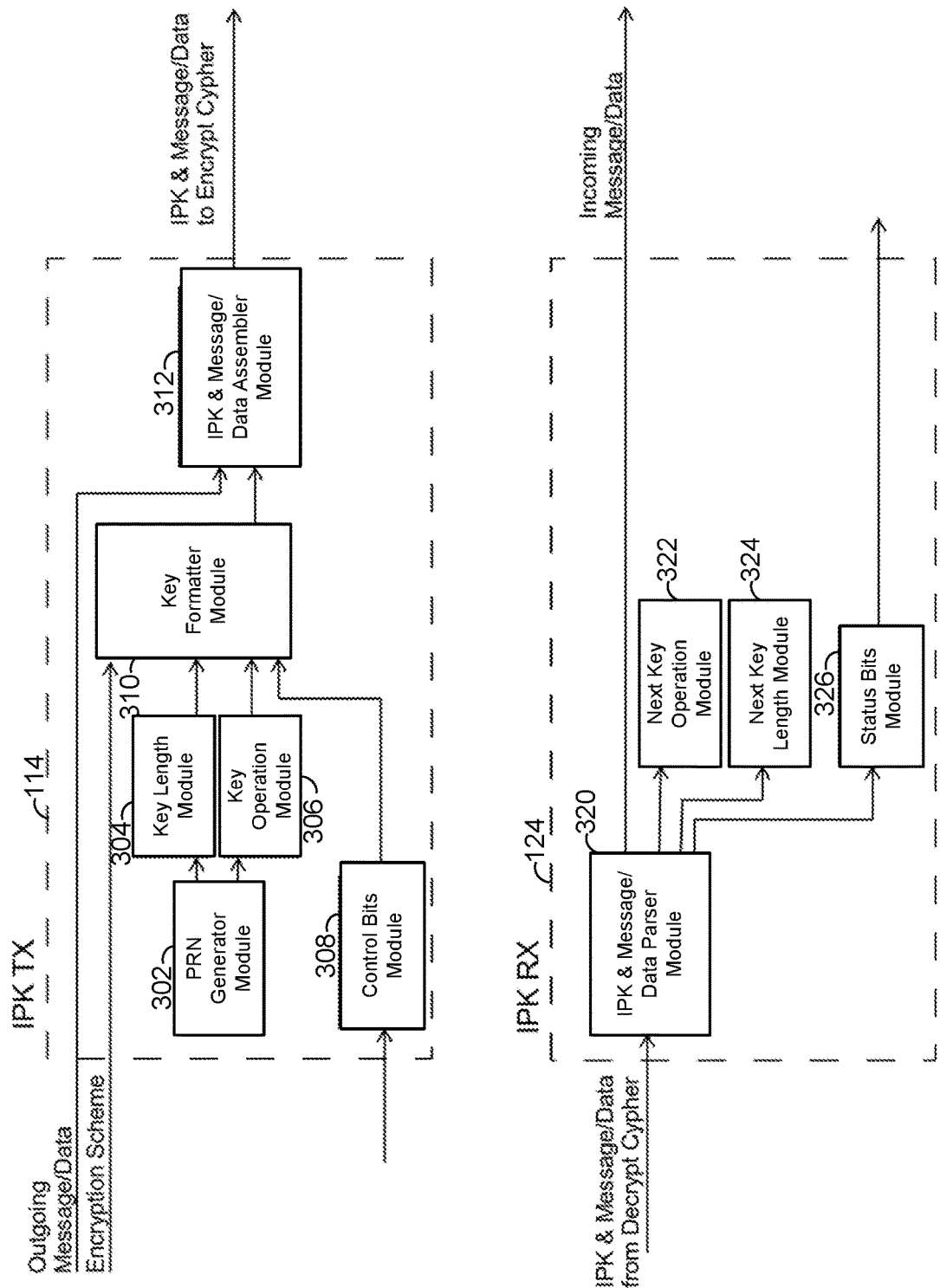
FIG. 3 illustrates a block diagram of an exemplary IPK-TX controller and an exemplary IPK-RX controller that may be utilized in the loosely coupled IPK encryption system of FIG. 1.

FIG. 3 illustrates a block diagram of an exemplary IPK-TX controller 114 and an exemplary IPK-RX controller 154 that may be utilized in the loosely coupled IPK encryption system 100 of FIG. 1. As shown in a top half of FIG. 3, the IPK-TX controller 114 has a plurality of inputs and outputs. A first input feeds into one or more modules or components within the IPK-TX controller 114. A second input also feeds into one or more modules or components within the IPK-TX controller 114. One or more modules of the IPK-TX controller 114 generates the output. The modules and components of the IPK-TX controller 114 prepare the IPK frame structure 200 and outgoing message or data for encryption, for example using the encrypt cipher processor 116.

The IPK-TX controller 114 comprises a PRN generator module 302, which provides an output that feeds a key length module 304 and a key operation module 306. The PRN generator module 302 may operate independently of other devices. The PRN generator module 302, as described above, may comprise an interface that receives a selection of PRN bits or a circuit or similar component that generates a sequence of PRN bits. The PRN bits from the PRN generator module 302 are used to determine a next key operation and/or a next key length that may be used when the second transceiver 150 wants to transmit information, etc., to the first transceiver 110.

The key length module 304 receives at least one of the PRN bits from the PRN generator module 302 and generates a feed to the key formatter module 310. The key length module 304 generates the part of the IPK frame structure 200 that instructs or identifies to set a length of the PRN key, for example, the key length field 204 as described above. For example, when the key length module 304 receives PRN bits identifying the PRN key length to be 128-bits, the key length module 304 may set a value of the key length field 204 to be 127. Thus, the loosely coupled IPK frame structure 200 identifies the length of the PRN key as being 128-bits. The PRN key length identified in the key length field 204 can remain the same as a previous or current PRN key length or change to a different PRN key length.

The PRN key length may remain the same or change to a different length between each or multiple communication messages or sessions between the first transceiver 110 and the second transceiver 150. For example, each communication session between the first transceiver 110 and the second transceiver 150 includes the loosely coupled IPK frame structure 200 with the key length field 204 indicating that a new or existing PRN key has a same or different length as a previous PRN key identified in the key length field 204. In some embodiments, the key length, as identified in the key length field 204, is changed on a periodic (for example, time) basis or after a set number of communication messages or sessions by one or more of the first transceiver 110 and the second transceiver 150. Changes in the key length may indicate changes, or hops, between different key lengths. Such changes or hops could occur as often as every communication message or session, as described herein. For example, such changes or hops may occur pursuant to the communication algorithm(s) described below.

The key operation module 306 receives at least one of the PRN bits from the PRN generator module 302 and generates a feed to the key formatter module 310. The key operation module 306 generates the part of the loosely coupled IPK frame structure 200 that instructs or identifies to perform various logical and arithmetic operations on the PRN key, for example, the key operation field 206 described above. For example, a value of the key operation field 206 may indicate one or more of the bit complementing, shifting, swapping, reversing, etc., key operations that may be performed individually or in various combinations on the PRN key to enhance security.

The key operation module 306 may identify in the loosely coupled IPK frame structure 200 the same or different operation or set of operations, as compared to a previous loosely coupled IPK frame structure 200, after each or multiple communication messages or sessions between the first transceiver 110 and the second transceiver 150. In some embodiments, the key operations is changed on a periodic (for example, time) basis or after a set number of communications by one or more of the first transceiver 110 and the second transceiver 150. Changes in the key operations may indicate changes, or hops, between different key operations. Such changes or hops could occur as often as every communication message or session, as described herein. For example, such changes or hops may occur pursuant to the communication algorithm(s) described below.

The input to the IPK-TX controller 114, as described above, comprises one or more encryption scheme bits and feeds into the key formatter module 310. The encryption scheme bits determine or identify a specific type of encryption/decryption that the respective encrypt/decrypt cipher processors (for example, the encrypt cipher processor 116 and the decrypt cipher processor 156) will perform or execute. The encrypt/decrypt cipher processors 116 and 156, respectively, may be flexible and robust to accommodate all possible encryption schemes that are identified in the encryption key input. While the ping-pong algorithm example, described below, assumes that the encryption scheme bits do not change, the encryption scheme bits could change, or hop, with every operation or communication message or session. The first transceiver 110 or an external entity may determine the encryption scheme to use and may provide the input comprising the encryption scheme bits. In some embodiments, the encryption scheme is changed on a periodic (for example, time) basis or after a set number of communications by one or more of the first transceiver 110 and the second transceiver 150. Changes in the encryption scheme bits may indicate changes, or hops, between different encryption schemes or algorithms. Such changes or hops could occur as often as every communication message or session, as described herein. For example, such changes or hops may occur pursuant to the communication algorithm(s) described below.

The control bits module 308 receives an input to the IPK-TX controller 114 comprising one or more control bits and provides an output that feeds the key formatter module 310. The control module 308 generates the part of the loosely coupled IPK frame structure 200 that instructs or identifies to the second transceiver 150 one or more tasks to perform, such as setup or device specific commands. As described above, the one or more control bits may instruct the second transceiver 150 of one or more tasks to perform, for example managing and/or maintaining one or more of a receiver IP address, a network topology, a communication protocol, a network or second transceiver 150 configuration, and/or device management, and so forth. For example, the control bits module 308 generates a value for the control bits field 208 that instructs the second transceiver 150 to change its network IP address.

The key formatter module 310 receives inputs from and arranges bits from each of the key length module 304, key operation module 306, and control bits module 308 and the encryption scheme input to create or generate the complete loosely coupled IPK frame structure 200. The key formatter module 310 provides an output that feeds an IPK & Message/Data assembler module 312. In some embodiments, as described herein, the arrangement of the fields, etc., in the IPK frame structure 200 varies based on various aspects, including IPK encryption system 100 design. In some embodiments, the key formatter module 310 includes status bits (for example, the status bits field 212) and/or additional bits or fields in creating or generating the loosely coupled IPK frame structure 200.

The IPK & Message/Data assembler module 312 concatenates the output of the key formatter module 310 with the outgoing message or data (thus generating the IPK/Message/Data). For example, the loosely coupled IPK frame structure 200 from the output of the key formatter module 310 and/or the outgoing message or data may be placed inside the header and/or payload portion of the transmission from the first transceiver 110 to the second transceiver 150.

As shown in a bottom half of FIG. 3, the IPK-RX controller 154 has inputs and outputs. A first input feeds into one or more modules or components within the IPK-RX controller 154. One or more modules of the IPK-RX controller 154 generates the output. The modules and components of the IPK-RX controller 154 parse the decrypted loosely coupled IPK frame structure 200.

The IPK-RX controller 154 comprises an IPK & Message/Data Parser module 320. The IPK parser module 320 may receive the input to the IPK-RX controller 154, which is received from the decrypt cipher processor 156 of FIG. 1. The IPK & Message/Data parser module 320 provides an output to each of a next key length module 322, a next key operation module 324 and a status bits module 326. The IPK & Message/Data parser module 320 separates the Message/Data and IPK functions from the IPK/Message/Data.

The next key length module 322 receives an input from the IPK & Message/Data parser module 320. The input received from the IPK & Message/Data parser module 320 may correspond to the key length field 202 of the loosely coupled IPK frame structure 200. The next key length module 322 may determine, based on the key length field 202, a size of the next PRN key, for example in support of the ping-pong algorithm described below. In some embodiments, if the next PRN is larger than the current PRN key, extra bits to create the next PRN key are obtained from a stored PRN key (for example, a master or initial PRN key or a previously processed PRN key). For example, the stored PRN key is the master or initial PRN key received when libraries and corresponding encryption data or information are correlated during an initial configuration.

The next key operation module 324 receives an input from the IPK & Message/Data parser module 320. The input received from the IPK & Message/Data parser module 320 may correspond to the key operation field 204 of the IPK frame structure 200. The next key operation module 324 may determine, based on the key operation field 204, operations to perform on the next PRN key, in support of, for example, the ping-pong algorithm described below.

The status bits module 326 receives an input from the IPK & Message/Data parser module 320 and provides an output to one or more components of the second transceiver 150 or to an external entity. The input received from the IPK & Message/Data parser module 320 may correspond to the status bits field 212 of the IPK frame structure 200. The status bits module 326 may determine, based on the status bits field 212, one or more particular status results or values (e.g. system status, environment).

Exemplary Loosely Coupled Communication Algorithms

In some embodiments, the communications of the IPK encryption system 100 described above are implemented according to one or more algorithms. For example, a scheduling algorithm coordinates communications according to one or more time periods or according to a quantity of communication sessions or messages transmitted. Thus, the communications of the IPK systems described above may implement the ping-pong, similar, or other algorithm, an example of which is described below. The use of the IPK encryption system 100 or frame structure as described provides a very flexible environment to enhance and strengthen security and may be implemented by the components described above with reference to FIG. 3. The IPK encryption system 100 can define, implement and execute the algorithm to change the PRN Keys based on performance, level of security, power, available memory, and system architecture.

The ping-pong algorithm, described below, allows changes to one or more of the PRN Key contents and size per the loosely coupled IPK frame structure 200. The ping-pong algorithm may change one or more of these values as often as every send and receive operation. As described below, the ping-pong algorithm references the first transceiver 110 and the second transceiver 150 from FIG. 1.

The first transceiver 110 (for example, the IPK-TX controller 114) and the second transceiver 150 (for example, the IPK-RX controller 154) start with an identical PRN Key: PRN Key0.

The first transceiver 110 determines IPK1 directives (length and operations changes) and assembles an IPK1 frame structure.

The first transceiver 110 encrypts (based on the current PRN Key0) the IPK1 frame structure (maybe with the outgoing message or data) and sends the encrypted IPK1 frame structure to the second transceiver 150. The first transceiver 110 anticipates a next or subsequent PRN key, PRN Key1, for a subsequent communication because the first transceiver 110 defined the PRN Key 1 when determining the IPK1 directives. The first transceiver 110 can then anticipate the next PRN key, PRN Key1, to use because the first transceiver 110 defines it.

The second transceiver 150 receives and decrypts the IPK1 frame structure (and the message or data, if included) using the PRN Key0.

The second transceiver 150 modifies the current PRN key0 per the directives included in the IPK1 frame structure to produce the PRN Key1 at the second transceiver 150.

The second transceiver 150 determines IPK2 directives (length and operations) and assembles an IPK2 frame structure.

The second transceiver 150 encrypts (based on the PRN Key1) the IPK2 frame structure (and message or data, if included) and sends the encrypted IPK2 frame structure to the first transceiver 110. The second transceiver 150 then anticipates a next or subsequent PRN key, PRN Key2, for a subsequent communication because the second transceiver 150 defined the PRN Key2 when determining the IPK2 directives. As above, the second transceiver 150 can then anticipate the next PRN key, PRN Key2, to use because the second transceiver 150 defines it.

The first transceiver 110 receives and decrypts the IPK2 frame structure (and the message or data, if included) using PRN Key1 that it anticipated.

The first transceiver 110 modifies the current PRN Key1 per the directives included in the IPK2 frame structure to produce the PRN Key2.

The first transceiver 110 determines IPK3 directives (length and operations) and assembles an IPK3 frame structure.

The first transceiver 110 encrypts IPK3 (based on the PRN Key2) the IPK3 frame structure (and message or data, if included) and send the encrypted IPK3 frame structure to the second transceiver 150. The first transceiver 110 anticipates a next or subsequent PRN key, PRN Key3, for a subsequent communication because the first transceiver 110 defined the PRN Key3 when determining the IPK3 directives.

These steps above may be repeated as the PRN key changes with every transfer between the first transceiver 110 and the second transceiver 150, creating the ping-pong effect. In some embodiments, the PRN key changes may be made after any (predetermined or dynamic) number of transfers or communications between the first transceiver 110 and the second transceiver 150 or on a periodic or scheduled basis. A rate of change or update of the PRN keys and IPK assemblies may be predetermined and/or based on performance, level of security, power, available memory, and system architecture.

In some embodiments, the communications between the first and second transceivers 110 and 150, respectively, is coordinated according to a schedule. In some embodiments, the schedule is generated or derived based on an algorithm implemented by one or both of the first and second transceivers 110, such as the ping-pong algorithm described above. In some embodiments, one or more of the first and second transceivers 110 and 150 (for example, one or more of the IPK-TX controller 114 and the encrypt cipher processor 116 in the first transceiver 110 and one or more of the IPK-RX controller 154 and the decrypt cipher processor 156 in the second transceiver 150), respectively, determine the schedule or the schedule is set by a device external to the first and second transceivers 110 and 150, respectively, for example during an initial configuration.

In some embodiments, the first and/or second transceivers 110 and 150 (for example, one of the IPK-TX controller 114, the encrypt cipher processor 116, the IPK-RX controller 154, and the decrypt cipher processor 156) implement or use the algorithm to generate or derive the schedule may control which of the first and second transceivers 110 and 150 is/are able to change any values of the IPK frame structure 200, when and how often any value of the IPK frame structure 200 can be changed, and/or under what conditions the first and/or second transceivers 110 and 150 is/are able to change any value of the IPK frame structure 200 (for example, what triggers the change in the value of the IPK frame structure 200). In some embodiments, the one or more of the IPK-TX controller 114 and the encrypt cipher processor 116 in the first transceiver 110 and one or more of the IPK-RX controller 154 and the decrypt cipher processor 156 in the second transceiver 150

Exemplary Tightly Coupled IPK Encryption System

Figure 4:
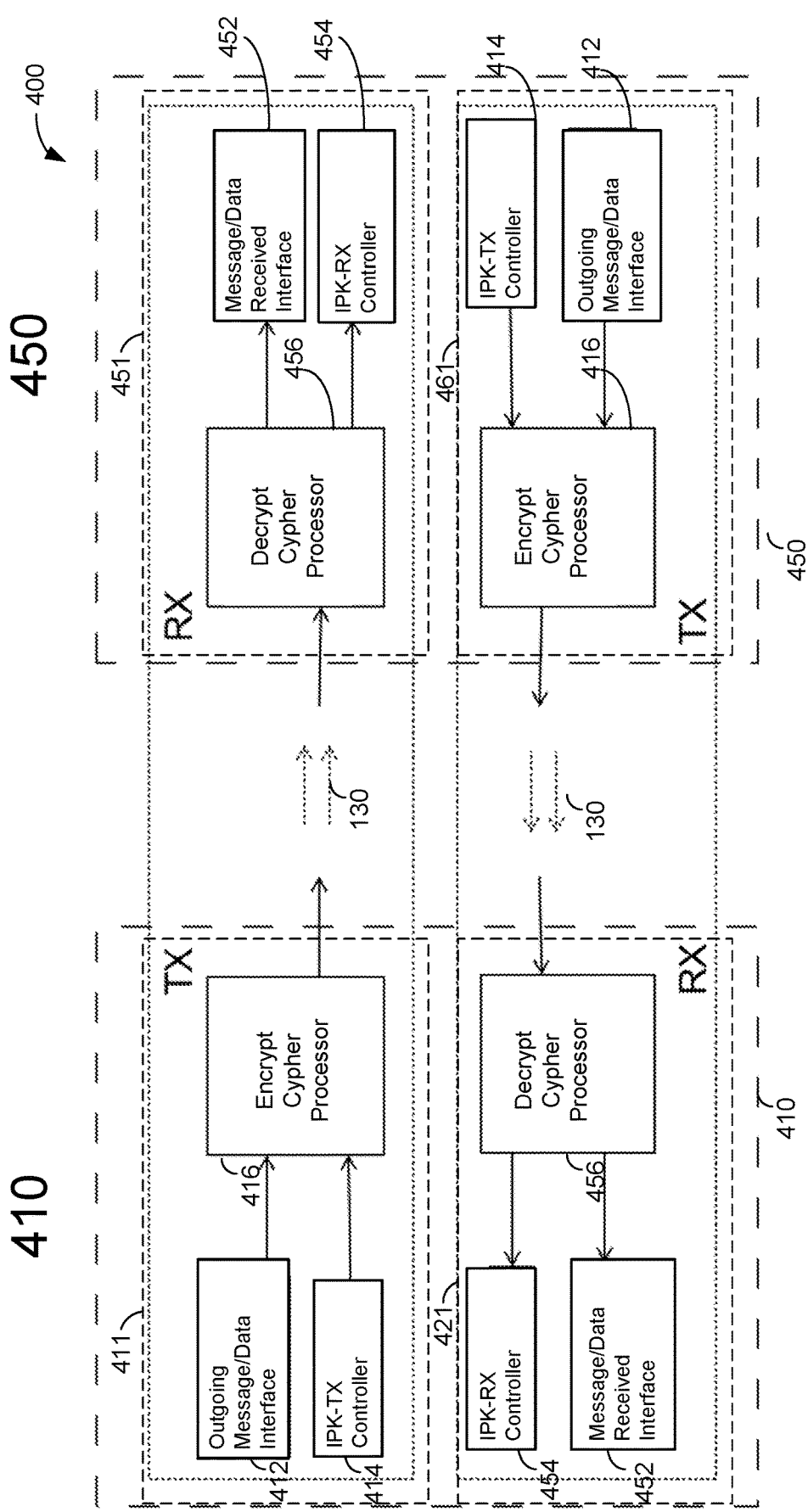
FIG. 4 is a functional block diagram of a tightly coupled intelligent private key (IPK) encryption system including communications between a first transceiver and a second transceiver, in accordance with some implementations.

FIG. 4 is a functional block diagram of a tightly coupled intelligent private key (IPK) encryption system 400 that provides communications between a first transceiver (for example, a source) 410 and a second transceiver (for example, a second transceiver 450) 450, in accordance with some implementations. The first transceiver 410 includes a transmitter 411 and a receiver 421. The transmitter 411 includes an outgoing message/data interface 412 that provides an output that feeds an encrypt cipher processor 416. The first transceiver 410 also includes an IPK-TX controller 414 that provides an output that feeds the encrypt cipher processor 416. The encrypt cipher processor 416 generates an output for the transmitter 411. The output of the transmitter 411 of the first transceiver 410 is transmitted and/or communicated, via a communication medium 130, as an input to the second transceiver 450, which includes a receiver 451 and a transmitter 461. In some embodiments, the communication medium 130 comprises a wired interface or medium in wired communication networks or a wireless interface or medium in wireless communication networks. The tightly coupled IPK encryption system 400 employs an encryption/decryption algorithm that concatenates bits of the tightly coupled IPK frame structure with the cryptographic key (for example, the PRN key) and then passes the concatenated IPK frame structure and cryptographic key to the encrypt cipher processor 416.

The top half of FIG. 4 shows a data flow path when sending an outgoing message or data from the first transceiver 410 to the second transceiver 450 (first transceiver transmitter 411 to second transceiver receiver 451). The bottom half of FIG. 4 shows the data flow path when sending a second outgoing message or data from the second transceiver 450 back to the first transceiver 410 (second transceiver transmitter 461 to first transceiver receiver 421).

As shown in FIG. 4, the top half of FIG. 4, the outgoing message/data interface 412 sends the outgoing message or data to the encrypt cipher processor 416 for encryption and transmission to the second transceiver 450. The outgoing message/data interface 412 may comprise a user interface, a memory unit, and/or a similar input interface. The outgoing message/data interface 412 may identify or otherwise determine, obtain, or store the outgoing message or data that will be encrypted and transmitted by the first transceiver 410 to the second transceiver 450.

The IPK-TX controller 414 provides information and directives to the encrypt cipher processor 416 to encrypt. The IPK-TX controller 414 generates and assembles the complete tightly coupled frame structure, as described below in further detail in FIG. 5, for use by the encrypt cipher processor 416. The IPK-TX controller 414 may comprise a hardware controller, processor, or similar circuit. The IPK-TX controller 414 may identify or obtain information and directives for the encryption scheme being applied to the communications between the first transceiver 410 and the second transceiver 450. The information and directives that the IPK-TX controller 414 provides may allow the encrypt cipher processor 416 to appropriately process the outgoing message or data in preparation for transmission.

In some embodiments, the first transceiver 410 and/or the second transceiver 450 comprise means for storing a plurality of parameters associated with a plurality of cryptographic protocols, the plurality of parameters comprising the initial common cryptographic key. In certain implementations, the means for storing the plurality of parameters is implemented by the IPK-TX controller 414 or the IPK-RX controller 454. In some implementations, the means for storing the plurality of parameters is implemented by one or more of the components of the IPK-TX controller 414, as described in further detail in FIG. 6 below. In certain implementations, the means for storing the plurality of parameters is configured to perform the functions of block 805, as described below with reference to FIG. 8.

Furthermore, the first transceiver 410 and/or the second transceiver 450 comprise means for generating a frame comprising a plurality of fields defining instructions related one or more of a first cryptographic scheme, a first cryptographic key operation, a first cryptographic key length, and a first cipher directive that are derived from the plurality of parameters for use in a subsequent communication session with the receiver device. In certain implementations, the means for generating the frame is implemented by one or more of the IPK-TX controller 414 or the IPK-RX controller 454. In certain implementations, the means for generating the frame is implemented by one or more of the components of the IPK-TX controller 414, as described in further detail in FIG. 6 below. In certain implementations, the means for generating the frame is configured to perform the functions of block 810, as described below with reference to FIG. 8.

The encrypt cipher processor 416 may comprise a hardware controller, a processor, or a similar circuit. The encrypt cipher processor 416 processes (for example, encrypts) the outgoing message or data to be transmitted to the second transceiver 450 based on the information and directives received from the IPK-TX controller 414. The encrypt cipher processor 416 may be capable of processing all of the bits of the tightly coupled IPK frame structure received from the IPK-TX controller 414. For example, in some instances, the bits in the tightly coupled IPK frame structure, as described in further detail below in FIG. 5, are interpreted or otherwise understood by the encrypt cipher processor 416 to impact encryption functions performed by the encrypt cipher processor 416. Alternatively, or additionally, the encrypt cipher processor 416 may securely pass the bits in the IPK frame structure 500 to the second transceiver 450. Accordingly, the encrypt cipher processor 416 may be configured to operate according to one or more customized and/or one or more standardized encryption schemes as per the system requirements. Details of specific functionality of the IPK-TX controller 414 are described below.

The second transceiver 450, described above as receiving the input from the first transceiver 410, includes a decrypt cipher processor 456 which provides an output that feeds both a message/data received interface 452 and an IPK-RX controller 414. The decrypt cipher processor 456 may comprise a hardware controller, a processor, or a similar circuit. The decrypt cipher processor 456 processes (for example, decrypts) the message or data received from the second transceiver 450 based on the information and directives received from the IPK-TX controller 414. The decrypt cipher processor 456 receives the encrypted IPK and message or data transmitted by the first transceiver 410 and decrypts these two entities. The decrypt cipher processor 456 may be capable of processing all of the bits of the tightly coupled IPK frame structure received from the first transceiver 410. For example, in some instances, the bits in the tightly coupled IPK frame structure, as described in further detail below, are interpreted or otherwise understood by the decrypt cipher processor 456 to impact decryption functions performed by the decrypt cipher processor 416. Alternatively, or additionally, the decrypt cipher processor 456 may securely receive the bits in the tightly coupled IPK frame structure from the first transceiver 410. Accordingly, the decrypt cipher processor 456 may be configured to operate according to one or more customized and/or one or more standardized decryption schemes. The second transceiver 450 now has the received message or data. Details of specific functionality of the IPK-RX controller 454 is described below.

The bottom half of FIG. 4, which includes the sending of the second outgoing message or data from the second transceiver 450 to the first transceiver 410, works the same as described with reference to the top half of FIG. 4, in reverse. Similar components between the second transceiver 450 and the first transceiver 410 are identified as such for clarity and convenience. Accordingly, both of the first transceiver 410 and the second transceiver 450 may transmit and/or receive the message or data using the components as described above. In some embodiments, the outgoing message or data is null and the first transceiver 410 and the second transceiver 450 only communicate IPK related changes via the transmissions or communications therebetween.

Exemplary IPK Frame Structure in Tightly Coupled Encryption System

As described above, the tightly coupled IPK frame structure can enhance security for example by changing one or more of the encryption scheme, the key operation, cipher directives, and key length. For example, the IPK-TX controller 414 and/or the encrypt cipher processor 416 may "change" the IPK frame structure 500 by adding or removing a field from the IPK frame structure 500. Alternatively, or additionally, the IPK-TX controller 414 and/or the encrypt cipher processor 416 may "change" the IPK frame structure 500 by storing or changing a value in the IPK frame structure 500, for example a value in one of the fields of the IPK frame structure 500. The tightly coupled IPK frame structure also provides the first transceiver 410 and the second transceiver 450 an ability to pass control and status functionality. Details regarding the tightly coupled IPK frame structure 200 are provided below.

Figure 5:
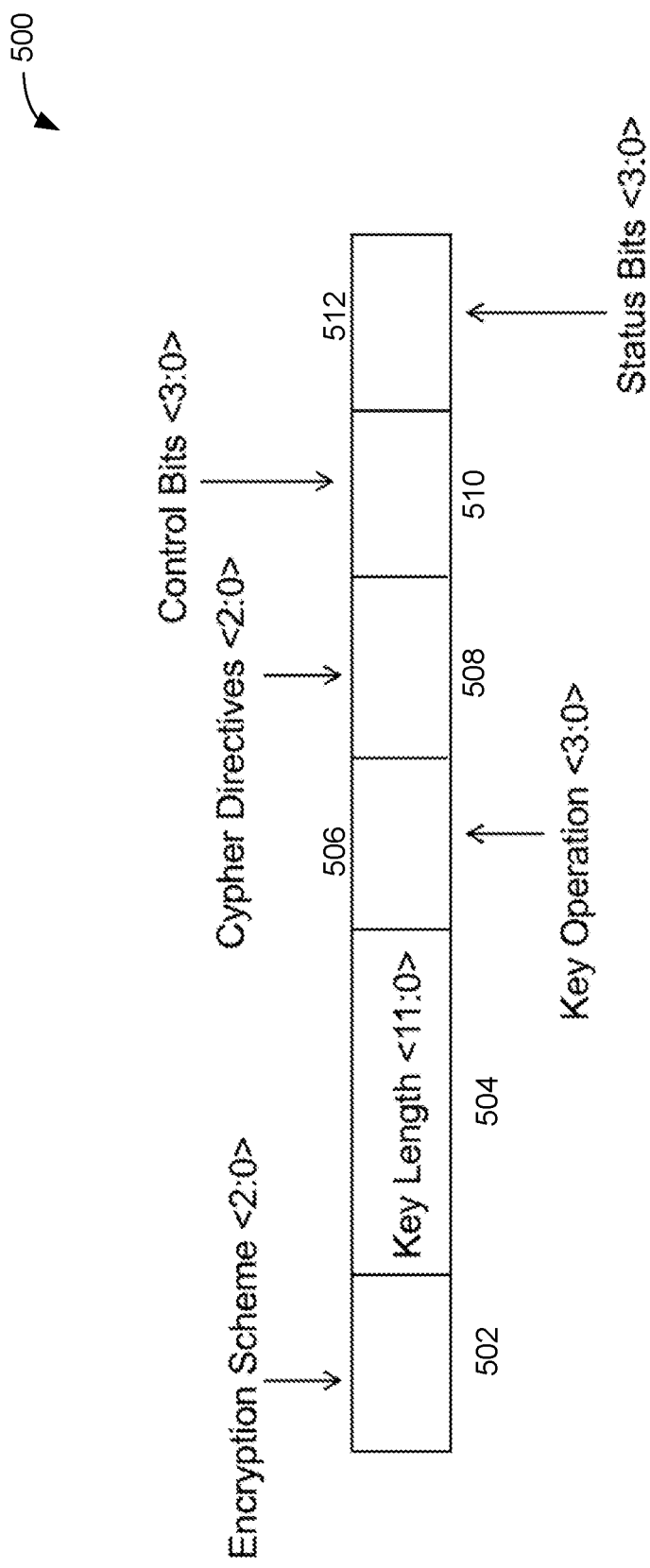
FIG. 5 shows a diagram of an exemplary tightly coupled IPK frame structure for use in the tightly coupled IPK encryption system of FIG. 4.

FIG. 5 shows a diagram of an exemplary tightly coupled IPK frame structure 500 for use in the tightly coupled IPK encryption system 400 of FIG. 4. The term "tightly coupled" generally refers to the logical and physical coupling of the IPK frame structure 500 to or with the PRN key. The tightly coupled IPK frame structure 500 may provide for reconfiguration (or switching) of the encryption scheme, key operations, key length, and/or cipher directives operating for communications between the first transceiver 410 and the second transceiver 450 to any supported industry standard or custom encryption scheme. The tightly coupled IPK frame structure 500 or system may identify details of and/or modify industry standard encryption schemes along with custom encryption schemes and may be intended to support non-industry (custom) and industry standard encryption schemes or configurations.

As shown in FIG. 5, the frame structure 500 includes six (6) different fields, each including one or more bits. From left to right, the frame structure 500 includes an encryption scheme field 502 having a length of three (3) bits, a key length field 504 having a length of twelve (12) bits, a key operation field 506 having a length of four (4) bits, a cipher directives field 508 having a length of three (3) bits, a control field 510 having a length of four (4) bits, and a status field 512 having a length of four (4) bits. In some implementations, an arrangement of the fields of the IPK frame structure 500 is different for different encryption systems based on system and security requirements for the different systems. Thus, the frame structure 500 may include a different number of fields, different fields, or different field lengths than those shown in FIG. 5. For example, the different fields of the frame structure 500 include any field length from, for example, one (1) bit to sixteen (16) bits, or any larger number of bits. In some embodiments, the frame structure 500 is generated by the IPK-TX controller 414 of the first transceiver 410 for transmission to the second transceiver 450. For example, a value of one or more of the fields of the frame structure 500 is set, established, or generated by the IPK-TX controller 414 based on one or more inputs or determinations, as described in further detail with reference to FIG. 6.

In some embodiments, one or more values of the fields of the tightly coupled IPK frame structure 500 may be changed as often as every communication transmitted by the first transceiver 410. Details of how values are assigned the fields 502-512 and/or how the frame structure 500 is generated are described in further detail with regard to FIG. 6 below. The IPK frame structure 500 could be used for any combination of the following functions, as described below. Other functions may be defined and/or redefined as other features are needed.

A value in the encryption scheme field 502 is generated, provided, or set by the IPK-TX controller 414. Encryption scheme bits included therein define or instruct available encryption/decryption options supported by the encrypt/ decrypt cipher processors 416 and 456, respectively, as described above in FIG. 4. For example, a value of the encryption scheme field 502 identifies the encryption scheme used with a subsequent PRN key for assembly and transmission. The three bits allows the encryption scheme field 502 to set the encryption scheme for the cipher processors 416 and 456. Table 3 below identifies exemplary encryption schemes and corresponding encryption scheme field 502 values:

TABLE 3

| Encryption Scheme<2:0> | Specific Encryption |
| --- | --- |
| 000 | NULL |
| 001 | 3DES |
| 010 | RC5 |
| 011 | AES_GCM_12 |
| 100 | AES_GCM_16 |
| 101 | CAMELLIA_CCM_16 |
| 110 | IPK-UAV |
| 111 | IPK-IoT |

The encryption schemes identified in Table 3 include a list of industry standard encryption schemes as well as custom encryption schemes. For example, the "IPK-UAV" and the "IPK-IoT" encryption schemes are custom encryption schemes while the remaining encryption schemes are industry standard encryption schemes. Accordingly, the encryption scheme field 502 may define one or more of the industry standard encryption schemes and/or custom encryption schemes that the encrypt cipher processor 416 and/or decrypt cipher processor 456 are capable of handling.

A value of the key length field 504 is generated, provided, or set by the IPK-TX controller 414. Key length bits included therein define or instruct the length of the PRN key. The PRN key length identified in the key length field 504 can remain the same or change to a different length. For example, in AES encryption, the PRN key length could change between any of 256, 192, and 128 bits, individually or according to any pattern. In some embodiments, a value of the key length field 204 identifies the length of the PRN key from 1-4096 bits. For example, a value of "0" in the key length field 504 represents a PRN key length of "1" bit while a value of "4095" in the key length field 504 represents a PRN key length of "4096" bits. In some embodiments, a value of the key length field 504 identifies the length of the PRN key from 1-256 bits or a set shorter key length to meet security requirements. In some embodiments, the key length field 504 identifies the length of the PRN key that is greater than 256 bits when the key length field 504 is sized accordingly. In some embodiments, key lengths could be devised or determined on non-byte boundaries in coordination with appropriate encryption/decryption.

A value of the key operation field 506 is generated, provided, or set by the IPK-TX controller 414. Key operation bits included therein define or instruct to perform various logical and/or arithmetic operations on the PRN Key, for example by the encrypt cipher processor 416 (or decrypt cipher processor 456). For example, the key operation field 506 indicates to the second transceiver 450 that the decrypt cipher processor 456 is to perform one or more of bit complementing, shifting, swapping, and reversing individually or in various combinations on the PRN key to enhance security. The four bits allow the key operation field 506 to set the key operations for the encrypt/decrypt cipher processors 416 and 456 to perform on the PRN key. Table 4 below identifies exemplary key operations and corresponding key operation field 506 values:

TABLE 4

| Key Op<3:0> | Specific Operation |
| --- | --- |
| 0000 | Do nothing |
| 0001 | Complement all bits |
| 0010 | Complement every other bit |
| 0011 | Complement every 7th bit |
| 0100 | Swap adjacent bytes |
| 0101 | Swap adjacent words |
| 0110 | Swap adjacent dwords |
| 0111 | Shift left 32 bits |
| 1000 | Shift left 47 bits |
| 1001 | Shift right 23 bits |
| 1010 | Shift right 9 bits |
| 1011 | Reverse all bits |
| 1100 | Reverse bits 9-23 |
| 1101 | Reverse bits 119-272 |
| 1110 | Complement every other bit and swap adjacent bytes |
| 1111 | Shift left 6 bits and reverse bits 16-31 |

A value of the cipher directives field 508 is generated, provided, or set by the IPK-TX controller 414. The cipher directives identified by the cipher directives field 508 are directly related to the encryption scheme as identified by the encryption scheme field 502. When industry standard encryption schemes such as Rivest-Shamir-Adleman (RSA) or AES encryption are selected and/or identified in the encryption scheme field 502, the respective standard cipher directive is executed. When one or more custom cipher directives is executed (for example, when a custom encryption scheme is selected) and/or identified in the encryption scheme field 502, the cipher directives bits in the cipher directives field 508 may determine encryption/decryption functions, options, and/or techniques including but not limited to XOR, scramble, or table lookup functions. For example, when the IPK-TX controller 414 generates the IPK frame structure 500, the IPK-TX controller 414 generates the IPK frame structure 500 to include at least one function associated with particular cipher directives (for example, one of those shown in Table 5 below) using the cipher directives field 508. Thus, the three bits in the cipher directives field 508 allow for selection of one of a variety of encryption techniques or options, as shown in Table 5 below:

TABLE 5

| Cipher Directive<2:0> | Specific Function |
| --- | --- |
| 000 | NULL |
| 001 | IL-XOR |
| 010 | Scramble |
| 011 | Table Lookup (ZOE, Base 2) |
| 100 | Table Lookup (ZOE, Base N) |
| 101 | Table Lookup (L*ZOE, Base N) |
| 110 | XOR + Table Lookup (L*ZOE, Base N) |
| 111 | XOR + Table Lookup (L*ZOE, Base N, RSS) |

In some embodiments, the custom encryptions schemes include unique and proprietary encryption functions specifically developed in the interest of crafting highly secure custom encryption schemes. For example, an exclusive OR (XOR) function forms the basis of a custom encryption scheme that interleaves the IPK frame structure 500 with the outgoing message or data (M/D). The XOR function leverages the dynamic "key length" (KL) capabilities of the IPK frame structure 500 such that one or more IPK bits could be interspersed between one or more bits of M/D, thus creating, for example, an "Interleaved, key Length XOR" ("IL-XOR") cipher directive. In cases where the "key length" (KL) is less than the length of the interleaved IPK frame structure 500 and M/D, the entire cryptographic key (for example, the PRN key) could be XOR'd with groups of bits of length KL until all of the interleaved IPK frame structure 500 the M/D is encrypted. In cases where the KL is longer than the interleaved IPK frame structure 500 and the M/D, the cryptographic key (for example, the PRN key) could be XOR'd to the entire IPK frame structure 500 and the M/D in successive operations until all cryptographic key bits are used. Techniques like "Interleaved, key Length" may be applied to other encryption functions such as Table Lookup and Scramble (for example, used in combination with the other encryption functions). In some embodiments, the IPK-TX controller 414 may consider one or more of encryption system security, performance, and power requirements when determining the computational complexity for a customized encryption function indicated in the IPK frame structure 500.

In some implementations, an additional cipher directive includes IL-P-XOR (IL-XOR with interleaved pseudo-random data). When the IPK frame structure 500 is transmitted without the outgoing message or data, one or more bits of PRN data may be interspersed between or with one or more bits of the IPK frame structure 500. When the IPK frame structure 500 is transmitted with the outgoing message or data, one or more bits of PRN data and one or more bits of the IPK frame structure 500 may be interspersed between or with the outgoing message or data. Thus, as shown in Table 5, the functions associated with particular cipher directives may be used individually or in combination with other specific functions.

In some implementations, the available cipher directives identify five variations of table lookup for encryption in the "Specific Function" column of Table 5. The first transceiver 410 (for example, the IPK-TX controller 414 or the encrypt cipher processor 416) may implement table lookup using an "encode index function" that acts as a pointer to map the unencrypted input data to encoded/encrypted data in a lookup table stored in the first transceiver 410 (for example, in a memory circuit). The corresponding second transceiver 450 may use a "decode index function" to decode/unencrypt the received encoded/encrypted data, where the "decode index" acts as a pointer to map the encrypted input data to output data in a lookup table stored in the second transceiver 450 (for example, in a memory circuit). The output data may match the unencrypted input data. Thus, the lookup table in the second transceiver 450 may be the reverse of the lookup table in the first transceiver 410.

The encode/decode index function of the table lookup may be implemented in various ways, including pseudo random data and linear block codes. Although pseudo-random data may be a straightforward, brute force approach, the implementation may be inefficient due to the exhaustive options that may be stored for each encoded bit to ensure a one to one mapping between source and encrypted data. Block codes may be more efficient than the use of pseudo-random data and there may be many block code options to evaluate. Upon analysis of the various block codes, parity block codes may be effective block codes for encryption or obfuscation because of their inherent ability to contain a one to one mapping between the source and encrypted data, as well as providing the most efficient encode ability. Parity block codes may generally be used in data recovery and error correction functions. Here, such parity block codes may be repurposed to generate encrypted data (for example, encrypted data vectors) to populate the lookup tables in the first and second transceivers 410 and 450, as described in further detail below. Because the parity block codes use one or more generator polynomial and initial seed combinations to encode and decode an entire string of input data, the parity block codes perform an atomic operation (for example, an operation that is performed entirely independently of other operations). Thus, there may be reduced or minimal processing overhead (e.g. CPU load) for the encode and decode functions that use the lookup table populated based on the parity block codes as compared to encode and decode functions that use lookup tables populated by other functions and/or codes. This type of table lookup that reduces or minimizes processing overhead will be referred to herein as Zero Overhead Encode (ZOE). The use of ZOE for the encode and corresponding encode/decode table lookup index functions will be demonstrated with several potential implementations, including base 2, base N, multiple Layers, combined with an XOR function, and Random Symbol Selection (RSS), as described in further detail below.

Table 5, provided above, shows examples of different ZOE cipher directive use cases (011, 100, 101, 110, and 111). For example, when the bits <2:0> of the cipher directive field 508 are set to 011, Table Lookup (ZOE, Base 2) the first transceiver 410 (for example, the IPK-TX controller 414 or the encrypt cipher processor 416) uses the table lookup implementation that uses ZOE as a Base 2 polynomial based encrypted vector generation scheme. As such, the Table Lookup can be implemented as a table lookup where the lookup table is populated with a certain collection of subsequent bits (Base 2) or a Base 2 encrypted vector. The encrypted vector generated can be sent from the first transceiver 410 to the second transceiver 450 and the data can be reconstructed using a standard syndrome decode at the second transceiver 450 (Base2).

When the bits <2:0> of the cipher directive field 508 are set to 100, the cipher directive fields 508 identifies Table Lookup (ZOE, Base N), which refers to the table lookup that uses ZOE with a Base N polynomial based encrypted vector generation scheme. The Table Lookup (ZOE, Base N) can be implemented as a table lookup where the lookup table is populated with a certain collection of subsequent bits (converted to a Base N index or Base N encrypted vector), as will be described in further detail below.

The encrypted vector generated can be sent from the first transceiver 410 to the second transceiver 450 and the data can be reconstructed using a standard syndrome decode at the second transceiver (Base N again). ZOE encoding may take the form of a generator polynomial in the Galois Field GF(N) where N is non-base 2 but may be a power of 2 for working with binary data. In some embodiments, N is 2 (for example, in Base 2 implementations). ZOE, Base N may provide significant obfuscation benefits as compared to ZOE, Base 2. For example, ZOE, Base N (when N is not 2) may have a larger search space as compared to ZOE, Base 2.

The generator polynomial or encrypted vector from the lookup table in the transceiver 410, for example represented by {A,B,C}, can be multiplied by an input data input vector, for example {X,Y,Z} to produce a combined data and encrypted vector {A,B,C,X,Y,Z}. The data vector {X,Y,Z} can be reconstructed at the second transceiver 450 from the encrypted vector {A,B,C}. Accordingly, the data vector {X,Y,Z} can be discarded from the combined data and encrypted vector {A,B,C,X,Y,Z} and the encrypted vector {A,B,C} can be sent alone in its place to the second transceiver 450.

An example in GF(16) using a 3×3 generator polynomial (matrix) with a 3×3 identity matrix (which provides a 6 element vector when encoding as described below):

| 3 | 8 | 5 | 1 | 0 | 0 |
|---|---|---|---|---|---|
| 14 | 11 | 10 | 0 | 1 | 0 |
| 0 | 6 | 9 | 0 | 0 | 1 |

An input data stream of 111000110001 may be converted into the data vector, where 1110=14, 0011=3, 0001=1. The data vector {14,3,1} (corresponding to the {X,Y,Z} vector above) multiplied by the generator matrix (i.e., using vector multiplication) modulo 16 may produce the combined data and encrypted vector {4,7,13,14,3,1} (corresponding to the {A,B,C,X,Y,Z} vector above). The first transceiver 410 can discard the data vector from the combined data and encrypted vector and send the encrypted vector {4,7,13} to the second transceiver 450 in place of the data vector (for example, after conversion to a binary format). Sufficient generator matrices need to produce a unique one to one mapping of input vectors to encoded vectors so that the encrypted vectors can be decrypted properly, which may be easily tested for.

The encoding can take the place of multistep multiplication, adding and modulus operations of the matrix multiply. In some embodiments, as a further optimization, every possible matrix multiplication for all possible data inputs for a particular generator matrix (for example, for one or more parity block code generator polynomial and initial seed combinations) is computed (for example, by the transceiver with the lookup table in memory) and stored in the lookup table. As such, the lookup table may be populated with encrypted data vectors. An example of such a populated lookup table (for the example 3×6 generator matrix above) is provided below.

{0,0,0,0,0,0},
{3,8,5,1,0,0},
{6,0,10,2,0,0},
{9,8,15,3,0,0},
{12,0,4,4,0,0}
.
.
.
{4,7,13,14,3,1}
.
.
.
{3,7,4,11,15,15},
{6,15,9,12,15,15},
{9,7,14,13,15,15},
{12,15,3,14,15,15},
{15,7,8,15,15,15}

Then, the encoding stage is, thus, simply a lookup based on the base 16 input vector as an index to the table. The decode then becomes a reverse lookup of the index produced by the encoded vector with a re-ordering of the columns of the complete table:

{   0,
    367,
    718,
    813,
    .
    .
    .
    1,
    .
    .
    .
}

For example, one of the IPK-TX controller 414 and the encrypt cipher processor 416 may convert binary data in a stream of 000100000000 to generate a data vector (similar to the representations above) in base 16 data vector of {1,0,0}. The encrypt cipher processor 416 may identify Base 16 encrypted vector {3,8,5} from its lookup table based on the data vector {1,0,0} (that points to the encrypted vector {3,8,5}). The IPK-TX controller 414 may convert the encrypted vector {3,8,5} to binary as 001110000101 for transmission to the transceiver 450. The transceiver 450 receives the binary 001110000101, and one of the decrypt cipher processor 454 or the IPK-RX controller 456 converts the binary 001110000101 to a decimal value of 901. The decrypt cipher processor 454 looks at the $901^{st}$ element (i.e., the lookup index) in a reverse lookup table in its memory to identify the data vector {1,0,0} which gives corresponds to the original binary data 000100000000.

When the bits <2:0> of the cipher directive field 508 are set to 101, Table Lookup (L*ZOE, base N) indicates that multiple Layers (L) of ZOE may be applied, using various functions or techniques including, but not limited to, iterative and nesting techniques, as part of the encode/decode scheme. Each layer may contain and incorporate information from real data to false data to noise to an ECC, or other system user defined data. Each layer may be processed for encoding and decoding with its respective ZOE encrypted vector generation scheme. Depending on the information of each layer, benefits are recognized. For example, in obfuscation embodiments, false data or noise may be included in one or more of the layers. For data integrity, ECC may be used in layers. Building on the {1,0,0} data vector example above, the encoded vector {3,8,5} can be encoded again with the full encoding matrix (the 3×6 generator matrix together with the 3×6 identify matrix identified above) to produce a six element vector of {9,14,12,3,8,5}. This vector can be modified (i.e. the table lookup function applied in a serial, iterative manner) with false data and sent as {9,14,12,1,5,3}. Any device intercepting the message cannot decode a complete message or might interpret {1,5,3} as the data vector. An authorized receiving device (for example, the transceiver 450 with the appropriate lookup tables, etc.), however, will understand to discard the {1,5,3} as false data, decode the {9,14,12} encoded vector as a {3,8,5} encoded vector and finally decode the index of 901 as to obtain the original data vector {1,0,0} as in the above example. Alternately for data integrity, the full second layer ZOE encoded vector {9,14,12,3,8,5} can be applied serially and be communicated between the first and second transceiver 410 and 450. When this vector is received up to any 3 symbols of the 6 symbols in the vector can be corrupted but the original encoded data vector {3,8,5} will be recovered using the decoding with the reverse lookup table. The resulting data will be decoded as above to produce the original data vector {1,0,0}.

When the bits <2:0> are set to 110, XOR+Table Lookup (L*ZOE, Base N) instructs that a private key may be XOR'd with the encrypted vector identified using the ZOE Table Lookup for additional obfuscation.

For the cipher directive field 508, when the bits <2:0> are set to 111, XOR+Table Lookup (L*ZOE, Base N, RSS) instructs that Random Symbol Selection may add another level of obfuscation by sending random symbol sets rather than just the encrypted vector symbols, which requires that the reverse lookup table must be generated for every combination of symbols to produce the corrected data. For example, the encrypt cipher processor 416 may XOR a key with the encrypted vector from the lookup table and then replace the values in the encrypted vector with one or more random symbols, therefore adding a layer of obfuscation to the table lookup and the XOR functions. Each of those combinations may be tried, since the random combination sent is unknown, which may increase overhead in the decode cycle. However, if some of the raw data cases do not make sense to send, there may effectively be the following combinations of columns of symbols for the example above which uses GF(16) and a 3×3 generator matrix:

1-2-3 regular encrypted vector case assuming 4-5-6 are the data columns, swapping in data columns provides the following sequence: 1-2-4; further swapping results in the following sequences:

1-2-5
1-2-6
1-4-3
1-5-3
1-6-3
4-2-3
5-2-3
6-2-3

One table may be generated for each of those 10 combinations, and then each of those tables may be decoded to see which one is the corrected data. If performed serially, an average of five (5) decoding cycles are performed, since the decoding may be terminated after the successful cycle.

Values of the control bits field 510 and the status bits field 512 are passed, generated, provided, or set by the IPK-TX controller 414. The control bits field 510 and the status bits field 512 pass or generate control and status information, respectively, to target devices, such as the second transceiver 450. The control bits included in the control bits field 510 instruct the second transceiver 450 (and similar devices) to perform certain tasks. The status bits included in the status bits field 512 provide status regarding certain things in an environment, for example, of the second transceiver 450, such as the first transceiver 410 or an external device.

In some embodiments, the control bits and/or the status bits include data to manage and/or maintain various aspects of the encryption system. For example, the control and/or status bits include data regarding a wide range of functions or data, such as network function (including, but not limited to, IP address, topology, protocol, configuration, and device management), payload data, block chain, modulation/constellation schemes, forward error correction, Artificial Intelligence (AI), fuzzy logic, and signal/noise (information, analysis, processing and feedback). Although this description does not use "data" that would be maintained as part of the IPK, one could define a wide range of applications to exploit this.

As discussed above, the IPK frame structure 500 may be applied in a wide range of communication systems (for example, telecommunication, satellite, GPS, PAN, LAN, MAN, and/or WAN systems) with wired and wireless communications protocols (for example, LTE, 5G, Wi-Fi, Bluetooth, and/or ZigBee protocols). The strategic definition and use of the control and status bits fields 510 and 512 of the IPK frame structure 500 for a given communication system and protocol(s) can be a very efficient and effective way to manage various aspects of the communication system. Coupling the control and status bits control and status bits fields 510 and 512 to the cryptographic functions of the IPK frame structure 500 is not required, but the security gained in protecting the communication system from outside attacks is extremely beneficial. The use of the control and status bits with communication protocols may be divided into two types: signal processing/communication (SP/Comm) and subsystem components. The signal processing/communication type relates to various aspects of the communication protocols, such as the modulation/constellation schemes. The subsystem components type relates to management of the various hardware elements in the IPK system.

In an exemplary embodiment, a wireless handset that utilizes LTE communication protocols can demonstrate the use of the control and status bits as part of control and status bits fields 510 and 512 in the IPK frame structure 500. Furthermore, the control and status bits fields 510 and 512 may be used to control how the IPK system makes changes to other fields that could be defined as part of the IPK frame structure 500. For example, the control and status bits of the IPK frame structure 500 may be used to communicate specifics of signal processing/communication (SP/Comm):

Modulation/Constellation Schemes—The control bits of the control bits field 510 may be defined to correlate to a library of modulation/constellation schemes for both encoding and decoding. By selecting different bit combinations, the IPK system can change the modulation/constellation scheme based on a variety of environmental requirements and conditions to achieve optimal communications.

Code Rate and Noise Tolerance—The control bits of the control bits field 510 may be defined to identify a specific data transfer Code Rate and environmental Noise Tolerance. The selection of the Code Rate and Noise Tolerance control bits can be used to optimize communication in addition to optimizing the modulation/constellation scheme selection.

Bit Error Rate (BER) feedback—The status bits of the status bits field 512 may correlate to real time BER feedback that can be used for various system decisions, including modulation/constellation scheme and code rate and noise tolerance selection. The BER feedback status bits can be stored for later use in trend analysis and modulation/constellation selection change prediction.

Re-transmit Requests—The status bits of the status bits field 512 may keep track of the number of re-transmit requests, which is useful for modulation/constellation scheme and code rate and noise tolerance selection.

In another example, the control and status bits of the IPK frame structure 500 may be used to communicate specifics of subsystem control functions (of, for example, the wireless LTE handset), for example:

RF band selection based on LTE band.

Low Noise Amplifier (LNA) selection based on LTE band and environment.

Power Amplifier (PA) selection based on LTE band and environment.

Digital Signal Processor (DSP) control.

Applications Processor (AP) control.

Transmissions (for example, messages) between the first transceiver 410 and the second transceiver 450 may include a header portion and a payload portion. The header portion generally identifies one or more parameters or aspects identifying information for one or more of the sender, receiver, and message. The payload portion generally includes the data or information of interest that is being communicated in the message. The tightly coupled IPK frame structure 500 may be transmitted as a message somewhere in the transmission stream.

In some embodiments, the IPK frame structure 500 also includes one or more additional fields that also defines nesting of keys, provides a definition of sub-keys, provides a re-definition of key operations (for example, what value(s) in the key operation field 506 correspond to a particular key operation), and cipher-specific directives. The one or more additional fields also defines a signature, such as a CRC signature, to expedite authentication. In some embodiments, a completely new PRN key could also be embedded in the loosely coupled IPK frame structure 500 in an additional field.

As indicated in the description above, the tightly coupled IPK frame structure 500 provides several of the same advantages and benefits as described in relation to the loosely coupled IPK frame structure 200, and will not be again described here. The encryption provided by the tightly coupled IPK frame structure 500 and system is further improved over the loosely coupled counterpart in that custom encryption schemes are introduced, which may further decrease the likelihood of a hacking or malevolent entity intercepting and being able to decrypt any communications between the transmitter 110 and the receiver 120, at least in part due to the inclusion of custom encryption scheme and cipher directive support.

The tightly coupled IPK frame structure 500 and system may include an ability to define the tightly coupled IPK frame structure 500 with provisions for changing any form of a cryptographic key including, but not limited to, encryption key content as derived from the PRN, the key length, and encryption/decryption cipher directives. In this implementation, the IPK shall be tightly coupled to the PRN derived encryption. A customized, programmable, and re-configurable cipher engine accommodates all of these features of the tightly coupled IPK frame structure 500 and system.

Exemplary IPK-TX and IPK-RX Controllers for Tightly Coupled IPKs

As described above, the IPK-TX controller 414 of the first transceiver 410 includes various components and functions regarding the transmission to the second transceiver 450. Similarly, the IPK-RX controller 454 of the second transceiver 450 includes various components and functions regarding the transmission received from the first transceiver 410. The structures and functions of the components of the IPK-TX controller 414 and the IPK-RX controller 454 will now be described in further detail.

Figure 6:
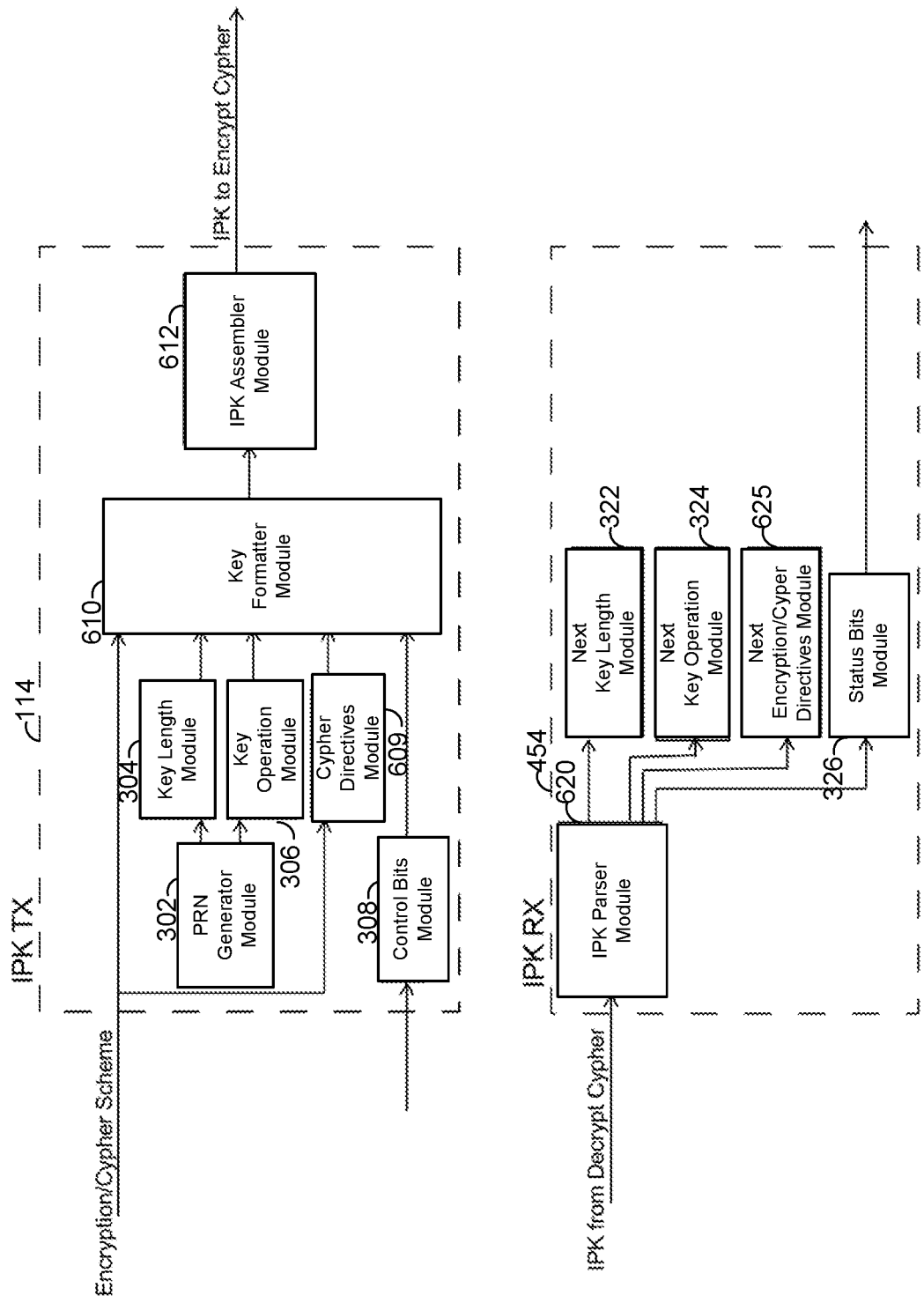
FIG. 6 illustrates a block diagram of an exemplary IPK-TX controller and an exemplary IPK-RX controller that may be utilized in the tightly coupled IPK encryption system of FIG. 4.

FIG. 6 illustrates a block diagram of an exemplary IPK-TX controller 414 and an exemplary IPK-RX controller 454 that may be utilized in the tightly coupled IPK encryption system 400 of FIG. 4. As shown in a top half of FIG. 6, the IPK-TX controller 414 has a plurality of inputs and outputs. A first input feeds into one or more modules or components within the IPK-TX controller 414. A second input also feeds into one or more modules or components within the IPK-TX controller 414. One or more modules of the IPK-TX controller 414 generates the output. The modules and components of the IPK-TX controller 414 prepare the IPK frame structure 500 for encryption.

The IPK-TX controller 414 comprises a PRN generator module 302, which provides an output that feeds a key length module 304 and a key operation module 306. The PRN generator module 302 may operate independently of other devices. The PRN generator module 302, as described above, may comprise an interface that receives a selection of PRN bits or a circuit or similar component that generates a sequence of PRN bits. The PRN bits from the PRN generator module 302 are used to determine a next key operation and/or a next key length that may be used when the second transceiver 450 wants to transmit information, etc., to the first transceiver 410.

The key length module 304 receives at least one of the PRN bits from the PRN generator module 302 and generates a feed to the key formatter module 610. The key length module 304 generates the part of the IPK frame structure 500 that instructs or identifies to set a length of the PRN key, for example, the key length field 504 as described above. For example, when the key 1 length module 304 receives PRN bits identifying the PRN key length to be 128-bits, the key length module 304 may set a value of the key length field 504 to be 127. Thus, the IPK frame structure 500 identifies the length of the PRN key as being 128-bits. The PRN key length identified in the key length field 504 can remain the same as a previous or current PRN key length or change to a different PRN key length.

The PRN key length may remain the same or change to a different length between each or multiple communication messages or sessions between the first transceiver 410 and the second transceiver 450. For example, each communication message or session from one of the first transceiver 410 and the second transceiver 450 includes the IPK frame structure 500 with the key length field 504 indicating that a new or existing PRN key has a same or different length as a previous PRN key identified in the key length field 504. In some embodiments, the key length, as identified in the key length field 504, is changed on a periodic (for example, time) basis or after a set number of communication messages or sessions by one or more of the first transceiver 410 and the second transceiver 450. Changes in the key length may indicate changes, or hops, between different key lengths. Such changes or hops could occur as often as every communication message or session, as described herein. For example, such changes or hops may occur pursuant to the communication algorithm(s) described below.

The key operation module 306 receives at least one of the PRN bits from the PRN generator module 302 and generates a feed to the key formatter module 610. The key operation module 306 generates the part of the IPK frame structure 500 that instructs or identifies to perform various logical and arithmetic operations on the PRN Key, for example the key operation field 506 described above. For example, a value of the key operation field 506 may indicate one or more of the bit complementing, shifting, swapping, reversing, etc. key operations that may be performed individually or in various combinations on the PRN key to enhance security.

The key operation module 306 may identify in the IPK frame structure 500 the same or different operation or set of operations, as compared to a previous IPK frame structure 500, after each or multiple communication messages or sessions between the first transceiver 410 and the second transceiver 450. In some embodiments, the key operations is changed on a periodic (for example, time) basis or after a set number of communications by one or more of the first transceiver 410 and the second transceiver 450. Changes in the key operations may indicate changes, or hops, between different key operations. Such changes or hops could occur as often as every communication message or session, as described herein. For example, such changes or hops may occur pursuant to the communication algorithm(s) described below.

The input to the IPK-TX controller 414, as described above, comprises one or more encryption/cipher scheme bits and provides an output that feeds into a cipher directives module 609 and the key formatter module 610. The encryption/cipher scheme bits determine or identify a specific type of encryption/decryption that the respective encrypt/decrypt cipher processors (for example, the encrypt cipher processor 416 and the decrypt cipher processor 456) will perform or execute. The encrypt and decrypt cipher processors 416 and 456, respectively, may be flexible and robust to accommodate all possible encryption schemes. The encryption/cipher scheme bits could change, or hop, with every operation or communication message or session. The first transceiver 410 or an external entity may determine the encryption/cipher scheme to use and may provide the input comprising the encryption/cipher scheme bits. In some embodiments, the encryption/cipher scheme is changed on a periodic (for example, time) basis or after a set number of communications by one or more of the first transceiver 410 and the second transceiver 450. Changes in the encryption/cipher scheme bits may indicate changes, or hops, between different encryption schemes or algorithms or cipher schemes or directives. Such changes or hops could occur as often as every communication message or session, as described herein. For example, such changes or hops may occur pursuant to the communication algorithm(s) described below.

The cipher directive module 609 receives an input from the encryption/cipher scheme input and provides an output that feeds into the key formatter module 610. The cipher directives module 609 generates the part of the IPK frame structure 500 that instructs or identifies one or more cipher directives, for example the cipher directives field 508 described above. The cipher directives are related to the encryption scheme and identify one or more specific ciphers operations, functions, or techniques to execute for a particular encryption scheme. For example, when an industry standard encryption scheme (e.g. RSA or AES) is selected, the respective industry standard cipher(s) is executed. When a custom encryption scheme is selected, one or more custom or industry standard cipher(s) is executed. When custom encryption schemes are available for selection, the corresponding encrypt/decrypt cipher processors 416 and 456, respectively, may be programmable and re-configurable according to the particulars of the encryption scheme or algorithm and cipher directives. In some embodiments, the bits in the cipher directives field 508 identify or determine encryption function, operation, techniques, or other options such as XOR, scramble, table lookup, etc., taken individually or in various combinations. As noted above, the first transceiver 410 or an external entity may determine the encryption/cipher scheme to use and may provide the input comprising the encryption/cipher scheme bits.

The control bits module 308 receives an input to the IPK-TX controller 414 comprising one or more control bits and provides an output that feeds the key formatter module 610. The control module 308 generates the part of the IPK frame structure 500 that instructs or identifies to the second transceiver 450, one or more tasks to perform, such as setup or device specific commands. For example, the control bits module 308 may generate the control bits field 510 in the IPK frame structure 500. As described above, the one or more control bits may instruct the second transceiver 450 of one or more tasks to perform, for example managing and/or maintaining one or more of a receiver IP address, a network topology, a communication protocol, a network or second transceiver 450 configuration, and/or device management, and so forth. For example, the control bits module 308 generates a value for the control bits field 508 that instructs the second transceiver 450 to change its network IP address.

The key formatter module 610 receives inputs from each of the key length module 304, the key operation module 306, the cipher directive module 609, the control bits module 308, and the encryption scheme/cipher input. The key formatter module 610 provides an output that feeds an IPK assembler module 612. In some embodiments, the key formatter module 610 includes status bits (for example, the status bits field 512) and/or additional bits or fields in the generated IPK frame structure 500.

The IPK assembler module 612 receives an input from the key formatter module 610 and generates the output for the IPK-TX controller 414. For example, the IPK assembler module 612 arranges bits from all the different sources via the key formatter module 610 (for example, the encryption/cipher scheme bits, the key length module 304, the key operation module 306, and the control module 308) to form the complete IPK frame structure 500. In some embodiments, as described herein, the arrangement of the fields, etc., in the IPK frame structure 500 varies based on various aspects, including IPK encryption system 400 design.

As shown in a bottom half of FIG. 6, the IPK-RX controller 454 has an input and an output. A first input feeds into one or more modules or components within the IPK-RX controller 454. One or more modules of the IPK-RX controller 454 generates the output. The modules and components of the IPK-RX controller 454 parse the decrypted IPK frame structure 500.

The IPK-RX controller 454 comprises an IPK parser module 620. The IPK parser module 620 may receive the input to the IPK-RX controller 454, which is received from the decrypt cipher processor 456 of FIG. 4. The IPK parser module 620 provides an output to each of a next key length module 522, a next key operation module 524, a next encryption/cipher directives module 625, and a status bits module 528. The IPK parser module 620 separates the various IPK functions based on parsing the various fields of the decrypted IPK frame structure 500 as received from the first transceiver 410.

The next key length module 522 receives an input from the IPK parser module 620. The next key length module 522 may determine, based on the key length field 502, a size of next PRN key, in support of, for example, the ping-pong algorithm. In some embodiments, if the next PRN is larger than the current PRN key, extra bits to create the next PRN key may be obtained from a stored PRN key (for example, a master or initial PRN key) or from the PRN generator module 502.

The next key operation module 524 receives an input from the IPK parser module 620. The next key operation module 524 may determine, based on the key operation field 504, operations to perform on the next PRN Key, in support of, for example, the ping-pong algorithm.

The next encryption/cipher directives module 625 receives an input from the IPK parser module 620. The input received from the IPK parser module 620 may correspond to the cipher directive field 508 of the IPK frame structure 500. The next encryption/cipher directives module 625 may determine, based on the cipher directive field 508, one or more specific next encryption (industry standard or custom) schemes. The next encryption cipher directives module 625 may also determine one or more cipher engine encryption (industry standard or custom) directives to be used, in support of, for example, the ping-pong algorithm.

The status bits module 528 receives an input from the IPK parser module 620 and provides an output to one or more components of the second transceiver 450 or to an external entity. The status bits module 528 may determine, based on the status bits field 512, one or more particular status results or values (e.g. system status, environment).

Exemplary Tightly Coupled Communication Algorithms

In some embodiments, the communications of the IPK system 400 described above are implemented accordingly to one or more algorithms. For example, a scheduling algorithm coordinates communications according to one or more time periods or according to a quantity of communication sessions or messages transmitted. Thus, the communications of the IPK systems described above may implement a ping-pong, similar, or other algorithm, an example of which is described below. The use of the IPK system 400 or frames as described above provides a very flexible environment to enhance and strengthen security and may be implemented by the components described above with reference to FIG. 6. The IPK system 400 can define, implement and execute the algorithm to change the encryption scheme (both standard and customized) and the PRN Keys based on performance, level of security, power, available memory, and system architecture.

In some embodiments, the first and/or second transceivers 410 and 450 (for example, one of the IPK-TX controller 414, the encrypt cipher processor 416, the IPK-RX controller 454, and the decrypt cipher processor 456) implement or use the scheduling algorithm to generate or derive the schedule may control which of the first and second transceivers 410 and 450 is/are able to change any values of the IPK frame structure 500, when and how often any value of the IPK frame structure 500 can be changed, and/or under what conditions the first and/or second transceivers 410 and 450 is/are able to change any value of the IPK frame structure 500 (for example, what triggers the change in the value of the IPK frame structure 500). In some embodiments, the one or more of the IPK-TX controller 414 and the encrypt cipher processor 416 in the first transceiver 410 and one or more of the IPK-RX controller 454 and the decrypt cipher processor 456 in the second transceiver 450. In some embodiments, the first and second transceivers 410 and 450 may use scheduling algorithms as described above with reference to the first and second transceivers 110 and 150. One example of the scheduling algorithm described herein is the ping-pong algorithm.

Figure 7:
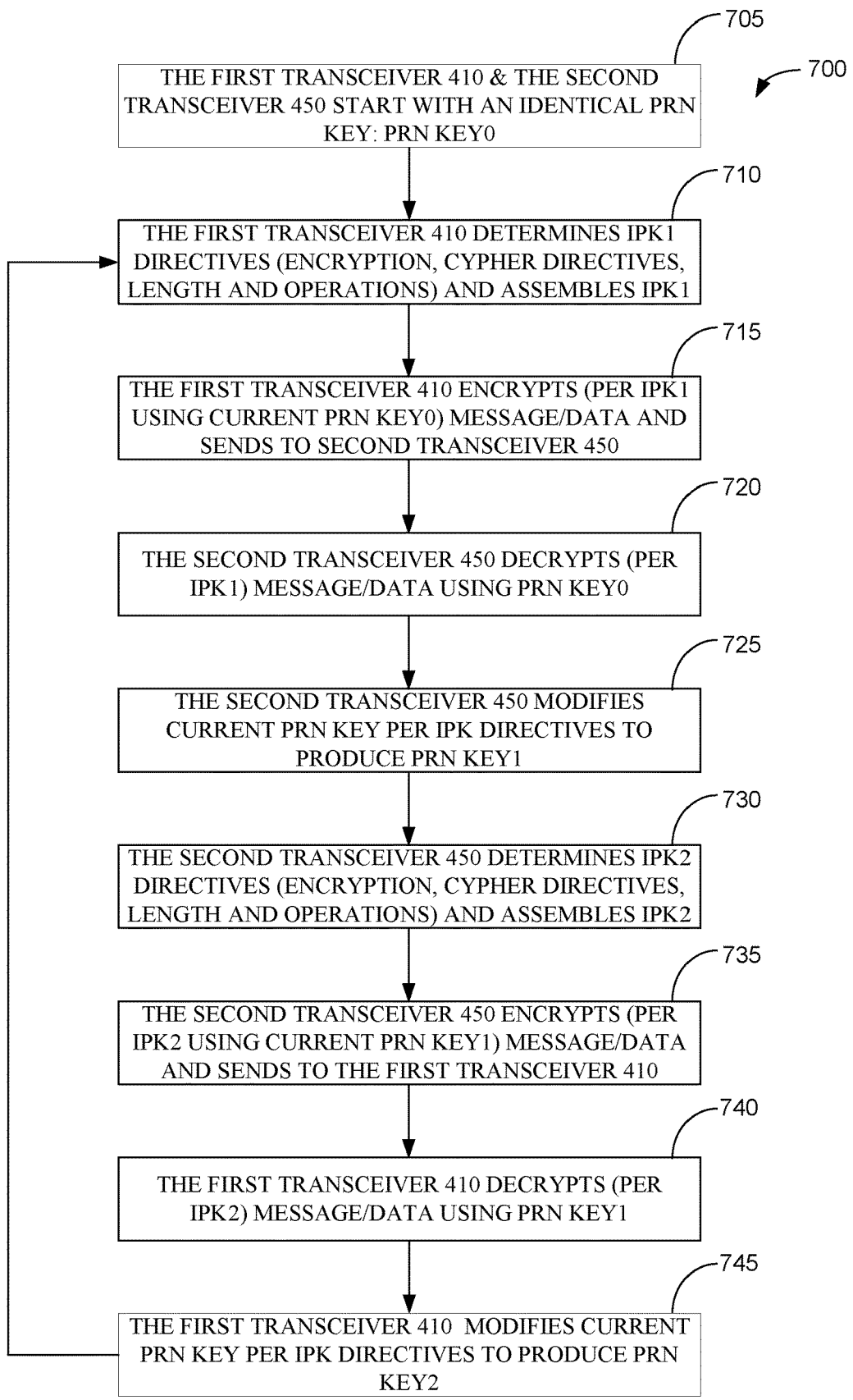
FIG. 7 shows a flowchart of a method of communicating via an exemplary tightly coupled communication algorithm.

The ping-pong algorithm is depicted in FIG. 7 as a flow chart of the method 700. In some embodiments, the method 700 is performed by one or more of the components of FIGS. 4 and 6, for example, the IPK-TX controller 414 or the encrypt cipher 416. In some embodiments, the method 700 described in relation to FIG. 7 similarly applies to the ping-pong algorithm described in relation to the loosely coupled communication algorithms described above, for example, without details of the cipher directives. The method 700 may be implemented by other suitable devices and systems or by one or more components of the identified transmitters 111, 161, 411, and 461. Although the method 700 is described herein with reference to a particular order, in various implementations, blocks herein may be performed in a different order, or omitted, and additional blocks may be added. For the description of the method 700 below, reference will be made to the first transceiver 410 and the second transceiver 450 (and the corresponding components of FIG. 4). However, any of the identified transceiver, or the components of the transceivers, may be substituted in the description of the method 700.

The ping-pong algorithm described below allows changes to one or more of the encryption scheme, cipher directives, and PRN Key contents and size per the tightly coupled IPK frame structure 500. The ping-pong algorithm may change one or more of these values as often as every send and receive operation. The ping-pong algorithm references the first transceiver 410 and the second transceiver 450 from FIG. 4.

At block 705, the first transceiver 410 (for example, the IPK-TX controller 414) and the second transceiver 450 (for example, the IPK-RX controller 154) start with identical PRN Keys: PRN Key0.

At block 710, the first transceiver 410 determines IPK1 directives (for example, one or more of encryption, cipher directives, length and operations) and assembles an IPK1 frame.

At block 715, the first transceiver 410 encrypts (per the IPK1 frame and based on the current PRN Key0) the outgoing message or data and sends the encrypted outgoing message or data to the second transceiver 450. The first transceiver 410 is able to anticipate a next or subsequent PRN key, PRN Key1, used with a subsequent communication because the first transceiver 410 determined the IPK1 frame directives. The first transceiver 410 can then anticipate the next PRN key, PRN Key1, to use because the first transceiver 410 defines it.

At block 720, the second transceiver 450 receives and decrypts the message or data using the PRN Key0 based on the IPK1.

At block 725, the second transceiver 450 modifies the current PRN Key0 per the directives, etc., included in the IPK1 frame structure to produce the PRN Key1.

At block 730, the second transceiver 450 determines IPK2 directives (for example, one or more of encryption, cipher directives, length and operations) and assembles an IPK2 frame structure.

At block 735, the second transceiver 450 encrypts (per the IPK2 frame structure and based on the PRN Key1) the message or data and sends the encrypted outgoing message or data to the first transceiver 410. The second transceiver 450 is able to anticipate a next or subsequent PRN key, PRN Key2, used with a subsequent communication because the second transceiver 450 determined the IPK2 frame structure directives. As described above for the first transceiver 410, the second transceiver 450 can then anticipate the next PRN key, PRN Key2, to use because the second transceiver 450 defines it.

At block 740, the first transceiver 410 receives and decrypts the message or data, using PRN Key1 that it anticipated based on the IPK2.

At block 745, the first transceiver 410 modifies the current PRN Key1 per the directives included in the IPK2 frame structure to produce the PRN Key2.

The first transceiver 410 may then repeat the loop of method 700 from block 710 when the first transceiver determines IPK3 directives (encryption, cipher directives, length and operations) and assembles an IPK3 frame structure.

The first transceiver 410 encrypts (per the IPK3 frame structure and using the PRN Key2) the message or data and sends the encrypted message or data to the second transceiver 450. The first transceiver 410 is able to anticipate a next or subsequent PRN key, PRN Key3, for a subsequent communication because the first transceiver 410 determines the IPK3 directives.

These steps above may be repeated as the PRN key changes with every transfer between the first transceiver 410 and the second transceiver 450, creating the ping-pong effect. In some embodiments, the PRN key changes may be made after any (predetermined or dynamic) number of transfers or communications between the first transceiver 410 and the second transceiver 450 or on a periodic or scheduled basis. A rate of change or update of the PRN keys and IPK assemblies may be predetermined and/or based on performance, level of security, power, available memory, and system architecture.

Figure 8:
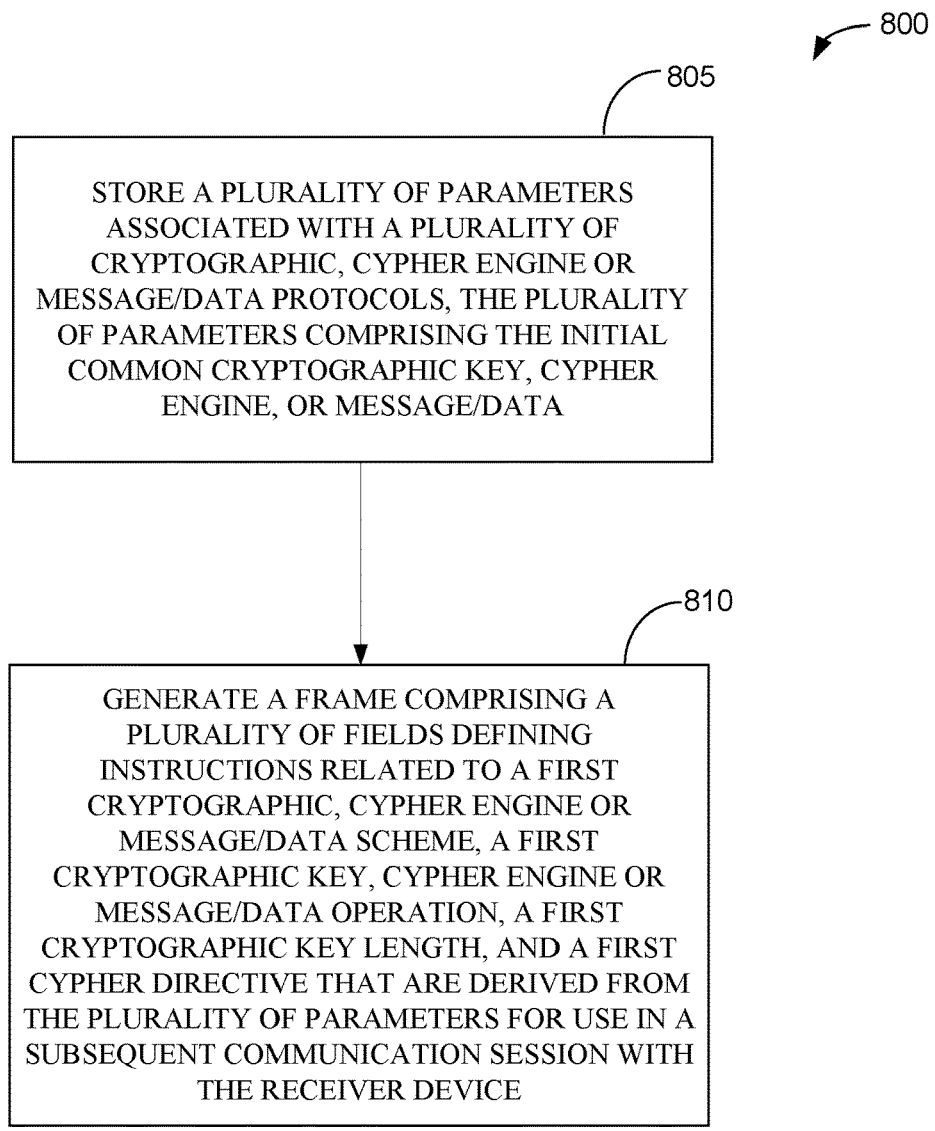
FIG. 8 shows a flowchart for a method of generating the frame structure of FIG. 5 by the components of the tightly coupled IPK encryption system of FIG. 4, in accordance with some implementations.

FIG. 8 shows a flowchart for a method 800 of generating the frame structure of FIG. 5 by the components of the tightly coupled IPK encryption system of FIG. 4, in accordance with some implementations. The method 800 may be performed by one or more of the components of the transmitter 111 or the transmitter 161 illustrated in FIG. 1. Method 800 may also be performed by the transmitter 411 or the transmitter 461 of FIG. 4. The method 800 may be implemented by other suitable devices and systems or by one or more components of the identified transmitters 111, 161, 411, and 461. Although the method 800 is described herein with reference to a particular order, in various implementations, blocks herein may be performed in a different order, or omitted, and additional blocks may be added. For the description of the method 800 below, reference will be made to the transmitter 411 (and the corresponding components of FIG. 4). However, any of the identified transmitters herein, or the components of the transmitters, or the components of the corresponding IPK encryption system 400 may be substituted for the transmitter 411 in the description of the method 800.

The method 800 begins at operation block 805 with the transmitter 411 storing a plurality of parameters associated with a plurality of cryptographic protocols, the plurality of parameters comprising the initial common cryptographic key. In some implementations, the transmitter 411 receives the plurality of parameters from another device (for example, through the configuration procedure associated with the configuration module described above). In some implementations, the transmitter 411 receives the plurality of parameters from the user interface. In some implementations, the parameters establish initial information for communicating between the first transceiver 410 (with the transmitter 411) and the second transceiver 450 (with the receiver 451). For example, the initial information that the transmitter 411 stores may be identical or generally the same or similar to the initial information that the receiver 451 stores. This initial information may be modified or manipulated as described above to generate the cryptographic key for use in subsequent communications.

At operation block 810, the transmitter 411 generates a frame comprising a plurality of fields defining instructions related one or more of a first cryptographic scheme, a first cryptographic key operation, a first cryptographic key length, and a first cipher directive that are derived from the plurality of parameters for use in a subsequent communication session with the receiver device. In some implementations, the frame may instruct the receiver 451 how to manipulate the initial information (for example, the initial common cryptographic key) for use in subsequent communications. For example, the frame includes a field defining one or more instructions to manipulate the initial common cryptographic key to generate a first cryptographic key that the first transceiver 410 and the second transceiver 450 will use in a subsequent communication. Alternatively, the frame may include a field defining one or more instructions regarding the first cipher directive to manipulate the initial common cipher engine to generate a custom cipher engine that the first transceiver 410 and the second transceiver 450 will use in a subsequent communication.

Figure 9:
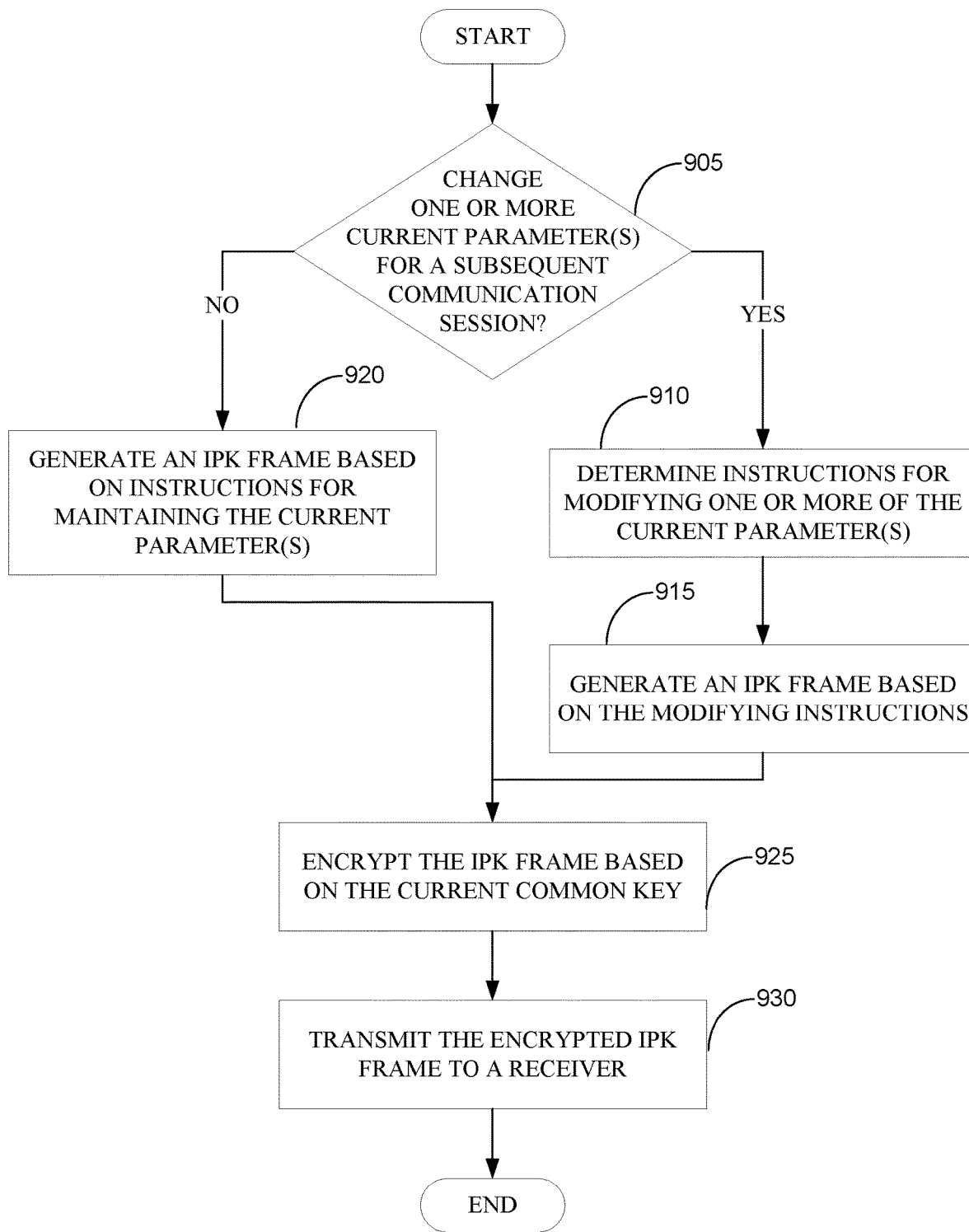
FIG. 9 shows a flowchart for a method of generating a frame by a transmitter for transmission to a receiver circuit, in accordance with some implementations.

FIG. 9 shows a flowchart for a method 900 of generating the frame 200 for transmission to the transceiver 150, in accordance with some implementations. The method 900 may be performed by one or more of the components of the first transceiver 110 or the second transceiver 150 illustrated in FIG. 1. Method 900 may also be performed by the first transceiver 410 or the second transceiver 450 of FIG. 4. The method 900 may be implemented by other suitable devices and systems or by one or more components of the identified transmitters 111, 161, 411, and 461. Although the method 900 is described herein with reference to a particular order, in various implementations, blocks herein may be performed in a different order, or omitted, and additional blocks may be added. For the description of the method 900 below, reference will be made to the first transceiver 110 (and the corresponding components of FIGS. 1 and 3). However, any of the identified transceivers herein, or the components of the transceivers, or the components of the corresponding IPK encryption system 100 may be substituted for the first transceiver 110 in the description of the method 900.

In some embodiments, though not shown here, the first transceiver 110 and the second transceiver 150 each share a current common key. Thus, the transmitter 111 and the receiver 151 share the current common key. In some embodiments, the current common key may be obtained, established, or shared by the first transceiver 110 and the second transceiver 150 during an initial configuration (for example, performed by the configuration module described above). Because the current common key is shared by the first transceiver 110 and the second transceiver 150 before communications begin (for example, before method 900 begins), the first transceiver 110 and the second transceiver 150 may communicate according to the method 900.

The method 900 begins at operation block 905 with the transmitter 111 determining whether to change one or more current parameters for a subsequent communication session. In some implementations, the subsequent communication session is a subsequent communication message or any communication that occurs later in time. In some embodiments, the determination to change the one or more current parameters may be made by the IPK-TX controller 114 based on a determination to change one or more parameters associated with a plurality of cryptographic protocols, the parameters comprising the initial common cryptographic key.

At block 910, when the transmitter 111 determines to change one or more current parameters for a subsequent communication session, the transmitter 111 determines instructions for modifying one or more of the current parameters. In some implementations, the determination of instructions for modifying the one or more current parameters may be made by identifying, for example by the IPK-TX controller 114, that the PRN generator module 302 generates bits or that the encryption/cipher scheme input is received.

At block 915, the transmitter 111 generates an IPK frame (for example, the tightly coupled IPK frame structure 200) based on the modifying instructions. In some embodiments, the IPK frame structure 200 is generated and/or assembled by the IPK & message/data assembler module 312.

Alternatively, at block 920 when the transmitter 111 determines not to change one or more current parameters for a subsequent communication session, the transmitter 111 assembles the IPK frame structure 200 based on the instructions for maintaining. In some embodiments, the IPK & message/data assembler module 312 may assemble the IPK frame structure 200. In such implementations, no new bits are generated and/or no new encryption/cipher scheme input is received and the IPK-TX controller 114 maintains the current parameters.

At block 925, the transmitter 111 encrypts the IPK frame structure 200 based on the current common key. For example, the encrypt cipher processor 116 encrypts the IPK frame structure 200.

At block 930, the transmitter 111 transmits the encrypted IPK frame structure 200 to the second transceiver 150, for example the transmitter 111. In some embodiments, the encrypted IPK frame structure 200 may be transmitted via the communication medium 130. After block 930, the method 900 terminates. In some embodiments, the method 900 may be repeated for each communication or communication session or periodically or after a fixed or variable number of communications or communication sessions between the first transceiver 110 and the second transceiver 150.

Figure 10:
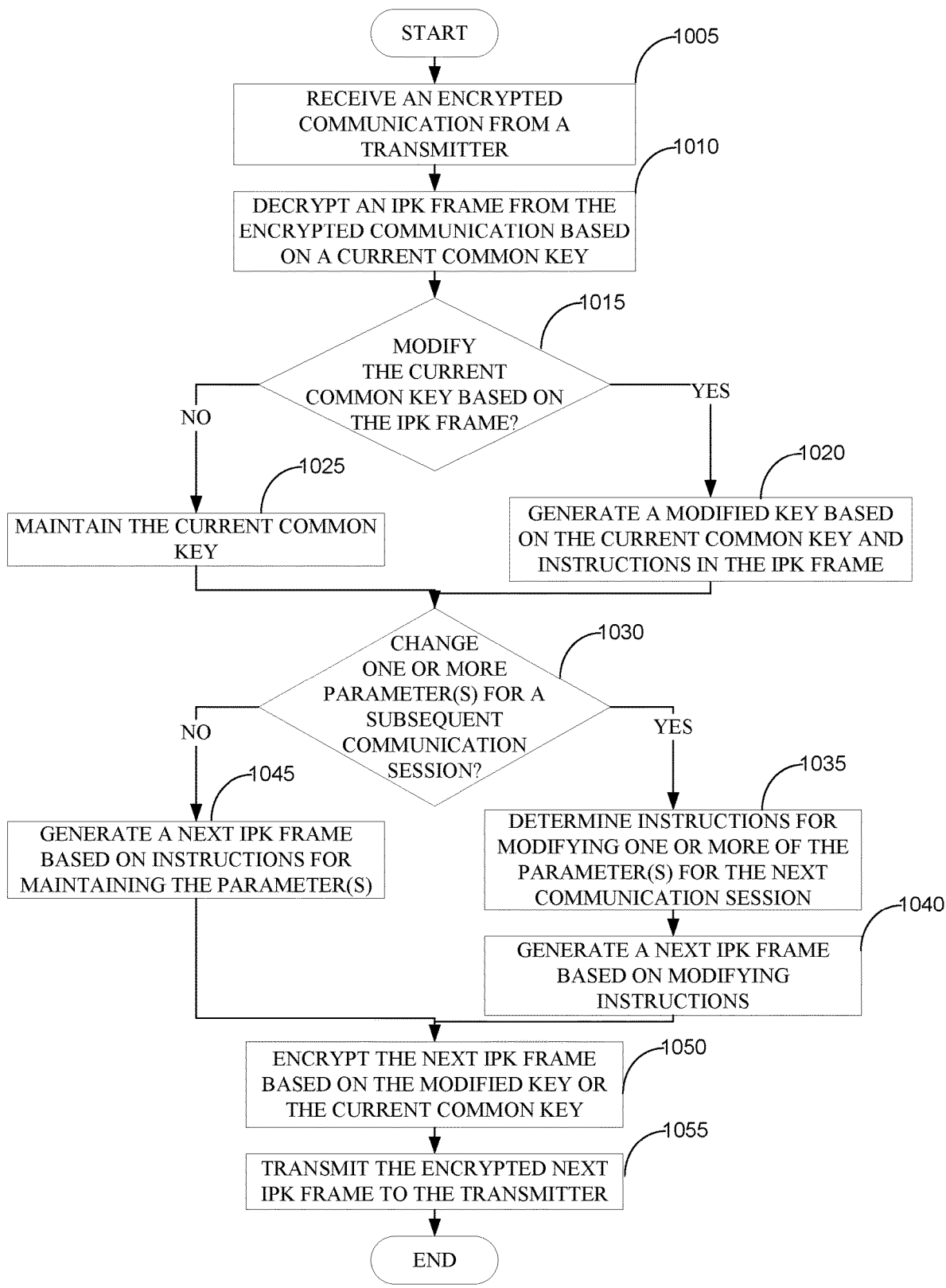
FIG. 10 shows a flowchart for a method of processing a frame by a receiver, in accordance with some implementations.

FIG. 10 shows a flowchart for a method 1000 of processing a frame by a receiver 151, in accordance with some implementations. The method 1000 may be performed by one or more of the components of the second transceiver 150 illustrated in FIG. 1. Method 1000 may also be performed by the first transceiver 110, the first transceiver 410, or the second transceiver 450 of FIG. 4. The method 1000 may be implemented by other suitable devices and systems or by one or more components of the identified transmitters 111, 161, 411, and 461. Although the method 1000 is described herein with reference to a particular order, in various implementations, blocks herein may be performed in a different order, or omitted, and additional blocks may be added. For the description of the method 1000 below, reference will be made to the second transceiver 150 (and the corresponding components of FIGS. 1 and 3). However, any of the identified transceivers herein, or the components of the transceivers, or the components of the corresponding IPK encryption system 100 may be substituted for the second transceiver 150 in the description of the method 1000.

In some embodiments, though not shown here, the first transceiver 110 and the second transceiver 150 may each share a current common key. Thus, the transmitter 111 and the receiver 151 share the current common key. In some embodiments, the current common key may be obtained, established, or shared by the first transceiver 110 and the second transceiver 150 during an initial configuration (for example, performed by the configuration module described above). Because the current common key is shared by the first transceiver 110 and the second transceiver 150 before communications begin (for example, before method 1000 begins), the first transceiver 110 and the second transceiver 150 may communicate according to the method 1000.

The method 1000 begins at operation block 1005 with the receiver 151 receiving an encrypted communication from a transmitter, for example the transmitter 111 of the first transceiver 110. In some embodiments, the encrypted communication is received via the communication medium 130.

At block 1010, the receiver 151 decrypts an IPK frame structure 200 from the encrypted communication based on the current common key. In some embodiments, the decrypt cipher processor 156 decrypts the IPK frame structure 200.

At block 1015, the receiver 151 determines whether to modify the current common key based on the IPK frame structure 200. For example, the IPK-RX controller 114 may check the IPK frame structure 200 decrypted from the encrypted communication and determine if the IPK frame structure 200 comprises instructions to change or update the current PRN key (for example the shared current common key, i.e., PRN Key0) or includes instructions to maintain the current PRN key.

At block 1020, when the receiver 151 determines to modify the current common key based on the IPK frame structure 200, the transmitter 151 generates a modified key (for example PRN Key1) based on the current common key (PRN Key0) and instructions in the IPK frame structure 200. In some embodiments, generating the modified key comprises applying one or more key operations or key length to the current common key.

At block 1025, when the receiver 151 determines to maintain the current common key (for example, PRN Key0), the transmitter 151 maintains the current common key without change. In some embodiments, the current common key may be maintained when each of the fields of the frame 200 include a NULL, or similar, value.

At block 1030, the receiver 151 and/or the transmitter 161 determines whether to change one or more parameters for a subsequent communication session. In some implementations, the subsequent communication session is a subsequent communication message or any communication that occurs later in time. In some embodiments, the determination to change the one or more parameters may be made by the IPK-RX controller 154 and/or the IPK-TX controller 114 based on a determination to change one or more parameters associated with a one or more of a plurality of cryptographic key protocols, the parameters comprising the initial common cryptographic key.

At block 1035, when the receiver 151 and/or the transmitter 161 determines to change one or more parameters for the subsequent communication session, the receiver 151 and/or the transmitter 161 determines instructions for modifying one or more of the parameters. In some implementations, the determination of instructions for modifying the one or more parameters may be made by identifying, for example by the IPK-RX controller 154 and/or the IPK-TX controller 114, that the PRN generator module 302 generates bits or that the encryption/cipher scheme input is received.

At block 1040, the transmitter 161 generates an IPK frame (for example, the tightly coupled IPK frame structure 200) based on the modifying instructions. In some embodiments, the IPK frame structure 200 is generated or assembled by the IPK & message/data assembler module 312.

Alternatively, at block 1045, when the receiver 151 and/or the transmitter 161 determines not to change one or more current parameters for a subsequent communication session, the receiver 151 and/or the transmitter 161 generates the IPK frame structure 200 based on instructions for maintaining the parameters. In some embodiments, the IPK & message/data assembler module 312 may assemble the IPK frame structure 200. In such implementations, no new bits are generated and/or no new encryption/cipher scheme input is received and the IPK-RX controller 154 and/or the IPK-TX controller 114 determines the instructions for maintaining the parameters.

At block 1050, the transmitter 161 encrypts the IPK frame structure 200 based on the current common key (for example when the transmitter 161 and/or the receiver 151 determined not to the change the current common key). Alternatively, the transmitter 161 encrypts the IPK frame structure 200 based on the modified key when the transmitter 161 and/or the receiver 151 determined to modify the current common key based on the decrypted IPK frame. For example, the encrypt cipher processor 116 encrypts the IPK frame structure 200.

At block 1055, the transmitter 161 transmits the encrypted IPK frame structure 200 to the first transceiver 110. In some embodiments, the encrypted IPK frame structure 200 may be transmitted via the communication medium 130. After block 1055, the method 1000 terminates. In some embodiments, the method 1000 may be repeated for each communication or communication session or periodically or after a fixed or variable number of communications or communication sessions between the first transceiver 110 and the second transceiver 150.

Additional Embodiments

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

In some aspects, a computer-implemented method for encoding binary data using an Intelligent Private Key (IPK) is disclosed. The computer-implement method comprises receiving, by a processor, a cryptographic key, cipher engine, or message/data. The computer-implemented method further comprises transforming, by the processor, the cryptographic key, cipher engine including a cryptographic algorithm, or message/data to a cryptographic key, cipher engine, or message/data as modified by the IPK.

In some aspects, the IPK is loosely coupled to the cryptographic key, cipher engine, or message/data. In some aspects, the IPK is modified according to a schedule derived by an algorithm such as, but not limited to, a ping-pong algorithm. In some aspects, the IPK is used to change the cryptographic algorithm in use as supported by the cipher engine. In some aspects, the IPK is used to apply various logical and arithmetic operations on the cryptographic key. In some aspects, the IPK nests multiple cryptographic keys, define sub-keys, and re-define key operations as well as link to other system structures, keys, cipher-specific directives, and new cryptographic keys.

In some aspects, the IPK modifies a cryptographic key length to introduce uncertainty into the cryptographic cipher. In some aspects, the IPK redirects control of the cipher from a host to a target device or back. Additionally, the IPK may use a wide range of functions, and subordinate data or configurations, such as network definition, including but not limited to IP address, topology, protocol, configuration, and device management), payload data, block chain data, modulation/constellation schemes, forward error correction, Artificial Intelligence (AI), fuzzy logic, and signal/noise (information, analysis, processing and feedback). In some aspects, the IPK includes control bits and status bits. In addition, the IPK may manage communications and/or the network architecture between communicating devices. In some aspects, the IPK fields are dynamic and flexible in definition and location and are redefined as necessary to achieve desired communications and network performance.

In some aspects, a system is disclosed. The system comprises a communications interface, a processor, and a non-transient memory medium operatively coupled to the processor. The memory medium is configured to store a plurality of instructions to implement an Intelligent Private Key (IPK). The IPK and/or the instructions is configured to program the processor to receive a cryptographic key, cipher engine, or message/data. The IPK and/or the instructions is further configured to program the processor to transform the cryptographic key, cipher engine including a cryptographic algorithm, or message/data to a cryptographic key, cipher engine, or message/data as modified by the IPK.

In some aspects, the IPK is loosely coupled to a cryptographic key, cipher engine, or message/data.

In some aspects, a non-transitory computer-readable memory medium configured to store instructions thereon that when loaded by a processor implement an Intelligent Private Key (IPK) is disclosed. The instructions cause the processor to receive a cryptographic key, cipher engine, or message/data. The instructions further cause the processor to transform the cryptographic key, cipher engine including a cryptographic algorithm, or message/data to a cryptographic key, cipher engine, or message/data as modified by the IPK.

In some aspects, a computer-implemented method comprising an Intelligent Private Key (IPK) is disclosed. The method comprises receiving, by a processor, a cryptographic key, cipher engine, or message/data. The method also comprises transforming, by the processor, the cryptographic key, cipher engine including a cryptographic algorithm, or message/data to a cryptographic key, cipher engine, or message/data as modified by the IPK.

In some aspects, a computing apparatus is disclosed. The computing apparatus comprises a processor, and a memory storing instructions where the processor and the memory storing instructions implement an Intelligent Private Key (IPK). The instructions, when executed by the processor, configure the apparatus to receive, by the processor, a cryptographic key, cipher engine, or message/data. The instructions, when executed by the processor, further configure the processor to transform the cryptographic key, cipher engine including a cryptographic algorithm, or message/data to a cryptographic key, cipher engine, or message/data as modified by the IPK.

In some aspects, a computing apparatus is disclosed. The computing apparatus comprises logic-based circuit(s) and a memory storing instructions. The instructions, when executed by the logic-based circuit(s) with or without use of memory-stored instructions resembling an Intelligent Private Key (IPK), configure the apparatus to receive, by a logic-based circuit(s), a cryptographic key, cipher engine, or message/data. The instructions further configure the apparatus to transform, by the logic-based circuit(s), the cryptographic key, cipher engine including a cryptographic algorithm, or message/data, to a cryptographic key, cipher engine, or message/data modified in a manner resembling an IPK. In some aspects, the IPK is coupled to a cryptographic key, cipher engine, or message/data.

In some aspects, a computer-implemented method for encoding binary data using an Intelligent Private Key (IPK) is disclosed. The method comprises receiving, by a processor, a cryptographic key, cipher engine, or message/data. The method also comprises transforming, by the processor, the cryptographic key, cipher engine including a cryptographic algorithm, or message/data to a cryptographic key, cipher engine, or message/data as modified by the IPK. In some aspects, the IPK is tightly coupled to a cryptographic key, cipher engine, or message/data.

In some aspects, the IPK includes cipher directives, such as but not limited to XOR, Scramble, and Table Lookup, and the ability to customize, program, and reconfigure the cipher engine. In some aspects, unique and proprietary encryption functions are derived from any combination of cipher directives, arithmetic functions and logical functions for execution by the cipher engine. In some aspects, the cipher engine is implemented in hardware, software, firmware or combination.

In some aspects, the IPK is used to change cryptographic algorithm in use as supported by the cipher engine.

In some aspects, a system is disclosed. The system comprises a communications interface, a processor, and a non-transient memory medium operatively coupled to the processor. The memory medium is configured to store a plurality of instructions to implement an Intelligent Private Key (IPK) and configured to program the processor to receive a cryptographic key, cipher engine, or message/data. The instructions are further configured to program the processor to transform the cryptographic key, cipher engine including a cryptographic algorithm, or message/data to a cryptographic key, cipher engine, or message/data as modified by the IPK. In some aspects, the IPK is tightly coupled to a cryptographic key, cipher engine, or message/data.

In some aspects, a non-transitory computer-readable memory medium configured to store instructions thereon that when loaded by a processor implement an Intelligent Private Key (IPK) is disclosed. The instructions cause the processor to receive a cryptographic key, cipher engine, or message/data. The instructions further cause the processor to transform the cryptographic key, cipher engine including a cryptographic algorithm, or message/data to a cryptographic key, cipher engine, or message/data as modified by the IPK. In some aspects, the IPK is tightly coupled to a cryptographic key, cipher engine, or message/data.

In some aspects, a computer-implemented method comprising an Intelligent Private Key (IPK) is disclosed. The method comprises receiving, by a processor, a cryptographic key, cipher engine, or message/data. The method further comprises transforming, by the processor, the cryptographic key, cipher engine including a cryptographic algorithm, or message/data to a cryptographic key, cipher engine, or message/data as modified by the IPK. In some aspects, the IPK is tightly coupled to a cryptographic key, cipher engine, or message/data.

In some aspects, a computing apparatus is disclosed. The computing apparatus comprises a processor and a memory storing instructions that implement an Intelligent Private Key (IPK), when executed by the processor. The instructions, when executed by the processor, configure the apparatus to receive, by the processor, a cryptographic key, cipher engine, or message/data. The instructions further configure the apparatus to transform, by the processor, the cryptographic key, cipher engine including a cryptographic algorithm, or message/data to a cryptographic key, cipher engine, or message/data as modified by the IPK. In some aspects, the IPK is tightly coupled to a cryptographic key, cipher engine, or message/data.

In some aspects, a computing apparatus is disclosed. The computing apparatus comprises logic-based circuit(s) and a memory storing instructions that, when executed by the logic-based circuit(s) with or without use of memory stored instructions resembling an Intelligent Private Key (IPK), configure the apparatus to receive, by a logic-based circuit(s), a cryptographic key, cipher engine, or message/data. The instructions further configure the apparatus to transform, by the logic-based circuit(s), the cryptographic key, cipher engine including a cryptographic algorithm, or message/data; to a cryptographic key, cipher engine, or message/data modified in a manner resembling an IPK. In some aspects, the instructions resembling the IPK are coupled to a cryptographic key, cipher engine, or message/data. In some aspects, the instructions resembling the IPK are applied according to a schedule derived by an algorithm such as, but not limited to, a ping-pong algorithm.

In some aspects, the IPK control bits may be defined and used to select the boundaries of the encryption search space (i.e. control the level of obfuscation). In other words, the control bits are defined to provide a range for the level of obfuscation desired. For some embodiments, relatively light encryption (lower degree of obfuscation with a corresponding search space control bit setting) will suffice; in some other embodiments, a high level of encryption (higher degree of obfuscation with a corresponding search space control bit setting) is desired. Also, these control bits could be defined and used to drive the options for other IPK frame structure bits, such as potential encryption schemes (industry standard and custom), cipher directives (for custom encryption), key operations, and key length. For example, a longer key length translates to a higher obfuscation. Control bits could be defined that set a minimum key length to ensure a certain level of obfuscation.

In some aspects, the IPK control bits may be defined and used to set the scheduling algorithm (e.g. Ping Pong) that is used in conjunction with the IPK frame structure. In other words, these control bits could be used to change which devices are able to modify IPK cryptographic related fields and how often modifications are made. A set of pre-defined scheduling algorithms could be defined and distributed to all the devices for an efficient implementation.

As described above, the IPK-TX controller 114 (or any of the IPK-TX controller 114, the IPK-TX controller 414, the IPK-RX controller 154, and the IPK-RX controller 454, interchangeable in the description herein) uses the IPK frame structure 200 of FIG. 2 (or FIG. 5, respectively) in wired or wireless communications with the IPK-RX controller 154. Additionally, or alternatively, the IPK-TX controller 114 (or any of the IPK-TX controller 114, the IPK-TX controller 414, the IPK-RX controller 154, and the IPK-RX controller 454, interchangeable in the description herein) may similarly use the IPK frame structure 200 when managing (for example, storing and/or retrieving) data in a data storage media. In some embodiments, the data storage media (for example, the memory or memory unit described above with reference to FIG. 1 or 4) communicates with the IPK-TX controller 114 via a non-networked or a networked connection. Examples of non-networked storage media include a Direct Attached Storage (DAS), cache memory, and so forth. Examples of networked storage media include a Storage Area Network (SAN), Network Attached Storage (NAS), and so forth. When the IPK controller 114 uses the IPK frame structure 200 to manage data in the non-networked or networked storage media, the IPK controller 114 may use the IPK frame structure 200 when communicating data to be stored to and/or retrieved from the storage media. In some embodiments, the IPK controller 114 manages reads from and writes to (storing and retrieving data) the storage media according to a schedule.

The IPK controller 114 may vary formatting (for example an arrangement or inclusion of fields) of the IPK frame structure 200 used for data storage/retrieval. This may be functionally similar to the IPK controller 114 varying the IPK frame structure 200 when communicating between devices (as described herein with reference to FIGS. 1, 3, 4, and 6). More specifically, changing or varying the IPK frame structure 200 may comprise including or removing one or more specific fields from the IPK frame structure 200. Alternatively, or additionally, the IPK controller 414 change values communicated in the fields (for example, fields 502-512 of FIG. 5) dependent on system and/or storage requirements of an embodiment. For example, in the networked storage embodiments, the IPK controller 414 may generate the IPK frame structure 500 to include the cipher directives field 508 along with one or more of the encryption scheme field 502, the key length field 504, the key operation field 506, the control bits field 510, and/or the status bits field 512 of the IPK frame structure 500. Alternatively, or additionally, in the non-networked storage embodiments, the IPK controller 414 may generate the IPK frame structure 500 with fewer fields than in the network storage embodiments (for example, excluding one or more of the encryption scheme field 502, the key length field 504, the key operation field 506, the control bits field 510, and/or the status bits field 512). For example, in the non-networked storage embodiments, the IPK controller 414 formats the IPK frame structure 500 to include the cipher directives field 508 alone when managing data in the storage media, for example, without any of the other fields identified above. Thus, the IPK controller 414 may generate the IPK frame structure 500 to indicate the ZOE lookup table in the cipher directive field 508 without including one or more other fields in the IPK frame structure 500 described above. Thus, in some embodiments, the IPK controller 414 has more options and/or information available for encrypting and/or obfuscating data for transmission when using the IPK frame structure 500 to manage data in the networked storage media as compared to in the non-networked storage embodiments. For example, the IPK controller 414 may include more fields to enable more encryption options when managing data in the networked storage media as compared to the non-networked storage media. By providing for such additional options, the IPK controller 414 may customize the IPK frame structure 500 based on the potential risks, constraints, etc., for communication of data with the networked storage media that may not exist with non-networked storage media. In some embodiments, the IPK controller 414 may use the same IPK frame structure 500 for both the networked and non-networked storage embodiments.

As used herein, the networked storage embodiments may be referred to as "open" environments due to communication of data outside a single device via a network. The non-networked storage embodiments may be referred to as "closed" environments. The open environment may be susceptible to more security risks than the closed environment because the network of the open environment may introduce security risks (for example, network sniffers, and so forth) not seen in the closed environment. Thus, the non-networked storage embodiments may have reduced security requirements when compared to the networked storage embodiments. In the non-networked storage embodiments, the IPK controller 414 is only concerned with using the IPK frame structure 500 to meet desired security requirements for the safe storage of data. On the other hand, in the networked storage embodiments, the IPK controller 414 may also be concerned with using the IPK frame structure 500 to manage the transmission of the data between devices and include more fields in the IPK frame structure 500 to ensure sufficient encryption/obfuscation options are available. Thus, the IPK controllers 414 and 454 may use the IPK frame structure 500 with only the cipher directive field 508 to manage the ZOE encrypted vector lookup tables described herein without introducing additional complexities of the other field(s) of the IPK frame structure 500. In some embodiments, the IPK frame structure that has or identifies only one ZOE encrypted vector lookup table is considered an "implied" or "zero field" IPK frame structure. In some embodiments, the IPK controllers may use the same IPK frame structure for both the open and closed environments.

Similar to the non-networked storage embodiments, in the networked storage embodiments, the IPK controller 414 may also use the tightly coupled IPK frame structure 500 described herein in data management, although with additional fields as compared to the non-networked storage embodiments. For example, in a networked Redundant Arrays of Independent Disks (RAID) embodiment, the IPK controller 414 may perform data recovery (for example, data correction and/or disk recovery) actions utilizing the tightly coupled IPK frame structure 500. However, unlike the non-networked storage embodiments, in the networked storage embodiments, the IPK controller 414 may have additional options available when using the IPK frame structure 500 due to the inclusion of all or a combination of the fields 502-512 in the IPK frame structure 500 in addition to the cipher directive field 508. For example, the IPK controller 414 may use the IPK frame structure 500 to identify or include customized ZOE cipher directives in the cipher directive field 508 along with specific key operations in the field 506, and so forth, providing the further encryption options. The additional options from including (by the IPK controller 414) all or any combination of the fields 502-512 in the IPK frame structure 500 for networked storage embodiments may provide benefits in addition to system security, performance and power requirements, such as further obfuscation and/or enhanced data recovery. In some embodiments, the IPK controller 414 may use the IPK frame structure 500 to provide additional obfuscation in existing RAID embodiments by using the IPK frame structure 500 to communicate data to RAID storage media. The IPK controller 414 may also use the IPK frame structure 500 in additional, newly developed, RAID embodiments to recognize additional benefits, for example data-recovery. In some embodiments, the IPK controller 414 may include the control and/or status bits described herein in the IPK frame structure 500 to manage storage hardware. For example, the IPK controller 414 may use the control and status bits in the IPK frame structure 500 to manage aspects of the disks and disk arrays including but not limited to disk writing, reading, read/write permissions, RAID and disk management, disk and/or disk sector error identification and data recovery.

In some embodiments, the IPK controller 414 may generate the IPK frame structure 500 to change one or more of the cryptographic scheme, cryptographic key operation, cryptographic key length, and cipher directives indicated in a previous IPK frame structure 500. This allows the IPK controller 414 to change how data is encrypted for future data storage/retrieval operations. Additionally, the IPK controller 414 may generate the IPK frame structure 500 to include a first field defining one of the cryptographic scheme, the cryptographic key operation, the cryptographic key length, and the cipher directives to store data. The IPK controller 414 may subsequently retrieve the stored data and decode it using or based on the information indicated in the first field of the IPK frame structure 500.

When the IPK controller 414 is using ZOE (and/or the IPK frame structure in general) in storage media management as described above (for example, as the IPK controller implement additional layers of ZOE, such as the iterative or nested embodiments), the stored data becomes less useful for a device that obtains the data in isolation from the corresponding IPK frame structure. For example, without having the corresponding IPK frame structure, the device may still access data stored in the storage media that could useful data or un-useful data such as noise. When the access data is un-useful data or noise, the device may be unaware that such data is noise. As more and more layers of ZOE are introduced, the obtained data becomes less and less useful to the device without the IPK frame structure. As described herein, the use of the IPK frame structure by the IPK controllers helps ensure that the device that randomly accesses data in the storage media is prevented from using the accessed data in context with any other data or operation.

As described above, the IPK controller (for example, IPK-TX controller 414) may use the IPK frame structure 500 to identify, for example, which ZOE lookup table to use for securely managing (storing and/or retrieving) in networked and/or non-networked storage embodiments. Additionally, the IPK controller 414 may use the IPK frame structure 500 (for example, using a new field) described herein to generate pseudorandom noise. For example, the IPK controller 414 may use the IPK frame structure 500 to generate data according to the ZOE lookup table identified in the IPK frame structure 500 and use the generated data as a source for noise. This noise may be included in communications regarding data for and/or management of the storage media. For example, the IPK controller 414 may generate the IPK frame structure 500 to include the noise to be stored in the storage media so that other devices see the noise in the communication and not useful information. Alternatively, or additionally, the IPK controller 414 may introduce a "noise" field in the IPK frame structure that defines how the noise (or pseudorandom noise) is generated. Based on such a "noise" field, when the transceiver 410 transmits the IPK frame structure 500 and/or the data, the transmission may look like noise. Alternatively, or additionally, the IPK controller 414 may introduce noise in the IPK frame structure 500 or payload data in communications between transceivers, such as the first transceiver 410 and the second transceiver 450. In some embodiments, the "noise" may be generated by interspersing PRN data into the IPK frame structure 500 or payload data in the communications.

As described herein, the IPK controller 414 may couple or use the IPK frame structure 500 to a private key cryptographic key. In some embodiments, the cryptographic key comprises a public key, a password, and a password hash. For example, the IPK controller 414 also couples or uses the frame structure 500 with public keys and/or passwords/password hashes. As such, the IPK controller 414 may couple the IPK frame structure 500 to the cryptographic key comprising any of the private key, the public key, the password, and/or the password hash. In some embodiments, the type of cryptographic key depends on particulars of the encryption involved in the corresponding system.

For example, systems implementing or utilizing symmetric encryption involve both transmitter 111 and receiver 151 (for example, though this may apply to any transmitter or receiver described herein) utilizing or having a secret common key. There are many ways the transmitter 111 and receiver 151 may share the secret common key. One way involves asymmetric encryption with the use of public and private keys, as is generally known. The IPK encryption system 100/400 may assist in the exchange of private keys to provide continuity in a transition from asymmetric to symmetric encryption. For example, the exchange of the private keys is completed using one or more IPK frame structure 200 (or 500) exchanges. In addition to private key exchange, other information is exchanged in the IPK frame structure 200.

In some embodiments, the IPK frame structure 200 used in the key exchange described above is coupled to and used with both a private key and a public key. To enable the coupling or use of the IPK frame structure 200 to the private and public keys, the transmitter 111 and receiver 151 may make two modifications to the IPK frame structure 200. For example, the transmitter 111 (via the IPK-TX controller 114 or the encrypt cipher processor 116) changes or modifies the encryption scheme field 202/502 to define asymmetric encryption between the first and second transceivers 110 and 150. Additionally, the transmitter 111 changes or modifies the cipher directive field 508 to specify a one-way mathematical operation. Using the one-way function specified by the cipher directive field 508 and the private key, the second transceiver 150 may generate the public key. Those skilled in current key exchange methodologies will understand the detailed process. Once the public key is generated, the IPK frame structure 200/500 is coupled to both the private and public keys. The private key can then be encrypted with or using the public key and sent from the second transceiver 450 to the first transceiver 410, thereby completing the key exchange task.

Furthermore, in some embodiments, user authentication (UA) may allow the transmitter 111 (for example, a grantor)

to verify an identity of the receiver 151 (for example, a requestor). The first transceiver 110 (interchangeable with any of the transceivers described herein) may use the IPK encryption system 100 or 400 for UA to establish continuity to asymmetric encryption (e.g. key exchanges) and symmetric encryption (e.g. data, video and voice transfers). A typical UA system involves a login ID and password. Where the IPK frame structure 200 or 500 is coupled not only to a private and public key, but also to a password/password hash, in two modifications to the IPK frame structure 500 are necessary. The encryption scheme field 502 of the IPK frame structure 500 may be used to define a UA encryption scheme with, for example, AES (Symmetric encryption) between the first and second transceivers 410 and 450. Also, the cipher directive field 508 of the IPK frame structure 500 may be used to specify a hash algorithm (e.g. SHA-256). After a key exchange between the grantor (for example, the first transceiver 410) and the requestor (for example, the second transceiver 410) has been completed (see above example of key exchange with the IPK frame structure), the requestor can generate a password hash (per the IPK frame structure 500 cipher directive field 508). The requestor then sends the password hash to the Grantor. Upon receipt of the password hash, the grantor determines if there is a match. If there is a match, then the grantor allows access to the requestor. The IPK frame structure is now coupled password/password hash in addition to the private and public keys.

Additional Considerations

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

In some implementations, one or more of various elements, aspects, or components of individual embodiments of devices and/or methods as described herein may be selectively combined or merged together with one or more elements, aspects, or components of one or more other embodiments described herein.

What is claimed is:

1. An apparatus for encoding a stream of data for transmission to a receiver device having a first common cryptographic key for a first communication with the apparatus, the apparatus comprising:
a memory device configured to store a plurality of parameters associated with at least one cryptographic protocol, the plurality of parameters comprising at least a first cryptographic scheme and a first cipher directive identifying a zero-overhead encode (ZOE) cipher that encrypts or decrypts data according to a repurposed error correction parity block code function;

a hardware processor configured to:
  generate a first frame comprising a plurality of fields defining instructions to derive a second common cryptographic key that encrypts or decrypts a subsequent communication with the receiver device, from the first common cryptographic key, based on identifying:
    the first cryptographic scheme, and
    the first cipher directive identifying the ZOE cipher; and
  encrypt the first frame using the first common cryptographic key to produce an encrypted frame; and
a communications circuit configured to:
  transmit the encrypted frame to the receiver device in the first communication, and
  communicate, in the subsequent communication, a second frame that is encrypted using the second common cryptographic key, the first cryptographic scheme, and the ZOE cipher.

2. The apparatus of claim 1, wherein the second frame comprises a field that identifies a second cryptographic scheme that is one of a custom or standard cryptographic scheme and a second cipher directive that comprises one of a custom cipher, a standard cipher, or the ZOE cipher.

3. The apparatus of claim 1, wherein:
  the ZOE cipher comprises multiple ZOE ciphers applied to encrypt or decrypt the data in layers in an iterative or nested manner, and
  the data is successively encrypted or decrypted, respectively, by each layer.

4. The apparatus of claim 1, wherein the ZOE cipher comprises a Base N polynomial based encrypted vector generation scheme to encrypt the data.

5. The apparatus of claim 1, wherein the ZOE cipher comprises a Random Symbol Selection (RSS) function to encrypt or decrypt the data.

6. The apparatus of claim 1, wherein the plurality of fields comprises a field identifying one or more control and status bits for managing the communications circuit and/or a protocol with which the first frame is transmitted to the receiver device.

7. The apparatus of claim 6, wherein the one or more control and status bits:
  convey data to the receiver device relating to one or more of (a) a network function, including an IP address, topology, protocol, configuration, and device management, (b) payload data, (c) block chain, (d) forward error correction, (e) Artificial Intelligence (AI), (f) fuzzy logic, or (g) signal-noise information; or
  comprises at least one control bit for at least one of controlling a modulation/constellation scheme for a communication protocol, controlling a code rate and noise tolerance for the communication protocol, and controlling a radio frequency band selection of the communications circuit, or at least one first status bit for at least one of monitoring a bit error feedback in the communication protocol and monitoring a number of re-transmit requests in the communication protocol.

8. The apparatus of claim 1, wherein the subsequent communication is coordinated according to a schedule derived based on one or more algorithms.

9. The apparatus of claim 1, wherein the plurality of fields further comprises a field including one or more control and status bits that control boundaries of an encryption search space.

10. The apparatus of claim 1, wherein the plurality of fields comprises a field for introducing noise into the first frame and/or the stream of data for transmission to the receiver device.

11. A method for encoding a stream of data for transmission to a receiver device having a first common cryptographic key for a first communication, the method comprising:
  storing a plurality of parameters associated with at least one cryptographic protocol, the plurality of parameters comprising at least a first cryptographic scheme and a first cipher directive identifying a zero-overhead encode (ZOE) cipher that encrypts or decrypts data according to a repurposed error correction parity block code function; and
  generating a first frame comprising a plurality of fields defining instructions to derive a second common cryptographic key that encrypts or decrypts a subsequent communication with the receiver device, from the first common cryptographic key, based on identifying:
    the first cryptographic scheme, and
    the first cipher directive identifying the ZOE cipher;
  encrypting the first frame using the first common cryptographic key to produce an encrypted frame;
  transmitting the encrypted frame to the receiver device in the first communication; and
  communicating, in the subsequent communication, a second frame that is encrypted using the second common cryptographic key, the first cryptographic scheme, and the first cipher directive.

12. The method of claim 11, wherein the second frame comprises a field that identifies a second cryptographic scheme that is one of a custom or standard cryptographic scheme and a second cipher directive that comprises one of a custom cipher, a standard cipher, or the ZOE cipher.

13. The method of claim 11, wherein:
  the ZOE cipher comprises multiple ZOE ciphers applied to encrypt or decrypt the data in layers in an iterative or nested manner, and
  the data is successively encrypted or decrypted, respectively, by each layer.

14. The method of claim 13, wherein the ZOE cipher comprises a Base N polynomial based encrypted vector generation scheme to encrypt the data.

15. The method of claim 11, wherein the ZOE cipher comprises a Random Symbol Selection (RSS) function to encrypt or decrypt the data.

16. The method of claim 11, wherein the plurality of fields comprises a field identifying one or more control and status bits for managing a communication system and/or a protocol with which the first frame is transmitted to the receiver device.

17. The method of claim 16, wherein the one or more control and status bits:
  comprises at least one control bit for at least one of controlling a modulation/constellation scheme for a communication protocol, controlling a code rate and noise tolerance for the communication protocol, and controlling a radio frequency band selection of a communications system circuit used for the first communication and the subsequent communication, or at least one first status bit for at least one of monitoring a bit error feedback in the communication protocol and monitoring a number of re-transmit requests in the communication protocol, or
  convey data to the receiver device relating to one or more of (a) a network function, including an IP address, topology, protocol, configuration, and device management, (b) payload data, (c) block chain, (d) forward error correction, (e) Artificial Intelligence (AI), (f) fuzzy logic, or (g) signal-noise information.

18. The method of claim 11, wherein the subsequent communication is coordinated according to a schedule derived based on one or more algorithms.

19. The method of claim 11, wherein the plurality of fields further comprises a field including one or more control and status bits that control boundaries of an encryption search space.

20. The method of claim 11, wherein the plurality of fields further comprises a field for introducing noise into the first frame and/or the stream of data for transmission to the receiver device.

21. An apparatus for encoding a stream of data for transmission to a receiver device having a first common cryptographic key for a first communication, the apparatus comprising:
 means for storing a plurality of parameters associated with at lease one cryptographic protocol, the plurality of parameters comprising at least a first cryptographic scheme and a first cipher directive identifying a zero-overhead encode (ZOE) cipher that encrypts or decrypts data according to a repurposed error correction parity block code function; and
 means for generating a first frame comprising a plurality of fields defining instructions to derive a second common cryptographic key that encrypts or decrypts a subsequent communication with the receiver device, from the first common cryptographic key, based on identifying:
  the first cryptographic scheme, and
  the first cipher directive identifying the ZOE cipher; and
 means for encrypting the first frame using the first common cryptographic key to produce an encrypted frame;
 means for transmitting the encrypted frame to the receiver device in the first communication; and
 means for communicating, in the subsequent communication, a second frame that is encrypted using the second common cryptographic key, the first cryptographic scheme, and the first cipher directive.

22. A non-transitory computer-readable medium comprising code that, when executed, causes an apparatus for encoding a stream of data for transmission to a receiver device having a first common cryptographic key for a first communication with the apparatus to:
 store a plurality of parameters associated with at least one cryptographic protocol, the plurality of parameters comprising at least a first cryptographic scheme and a first cipher directive identifying a zero-overhead encode (ZOE) cipher that encrypts or decrypts data according to a repurposed error correction parity block code function; and
 generate a first frame comprising a plurality of fields defining instructions to derive a second common cryptographic key that encrypts or decrypts a subsequent communication with the receiver device, from the first common cryptographic key, based on identifying:
  the first cryptographic scheme, and
  the first cipher directive identifying the ZOE cipher; and
 encrypt the first frame using the first common cryptographic key to produce an encrypted frame;
 transmit the encrypted frame to the receiver device in the first communication; and
 communicate, in the subsequent communication, a second frame that is encrypted using the second common cryptographic key, the first cryptographic scheme, and the first cipher directive.

\* \* \* \* \*